United States Patent
Ban et al.

(10) Patent No.: US 7,068,835 B1
(45) Date of Patent: Jun. 27, 2006

(54) DATA PROCESSING APPARATUS FOR PROCESSING A 3-DIMENSIONAL DATA OF AN OBJECT AND A METHOD THEREFOR

(75) Inventors: Shinichi Ban, Kobe (JP); Toshihiko Karasaki, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 718 days.

(21) Appl. No.: 09/198,534

(22) Filed: Nov. 24, 1998

(30) Foreign Application Priority Data

| Nov. 28, 1997 | (JP) | 9-327961 |
| Dec. 19, 1997 | (JP) | 9-350394 |
| Dec. 26, 1997 | (JP) | 9-358860 |
| Dec. 26, 1997 | (JP) | 9-358861 |
| Apr. 28, 1998 | (JP) | 10-118091 |
| May 20, 1998 | (JP) | 10-137912 |

(51) Int. Cl.
*G06K 9/00* (2006.01)
(52) U.S. Cl. .................................... 382/154
(58) Field of Classification Search ............... 382/154, 382/285, 276; 345/433, 435, 427, 133, 139; 356/12; 348/578, 580
See application file for complete search history.

(56) References Cited

U.S. PATENT DOCUMENTS

| 5,214,511 A | * | 5/1993 | Tanaka .................. 348/580 |
| 5,282,262 A | * | 1/1994 | Kurashige .............. 345/426 |
| 5,668,631 A | | 9/1997 | Norita et al. |
| 5,757,321 A | * | 5/1998 | Bikkyard ............... 345/434 |
| 5,821,941 A | * | 10/1998 | Millstein ............... 345/420 |
| 6,141,431 A | * | 10/2000 | Munetsugu et al. ...... 382/100 |
| 6,346,949 B1 | | 2/2002 | Fujiwara et al. |
| 6,677,944 B1 | * | 1/2004 | Yamamoto ............... 345/422 |

FOREIGN PATENT DOCUMENTS

| JP | 05-108804 | 4/1993 |
| JP | 06-259532 | 9/1994 |
| JP | 8-147494 | 6/1996 |
| JP | 9-138865 | 5/1997 |
| JP | 9-270026 | 10/1997 |
| JP | 09-311707 | 12/1997 |

OTHER PUBLICATIONS

"Way to 3D Master / Shade Professional R2 Ver.", MdN Corporation Dec. 1, 1997, No. 44, pp. 120-123.
"Three-dimensional Shape Modeling Using Drawings from Four Ways" Journal of The Institute of Electronics, Information and Communication Engineers (Information and system II - Information processing), Institute of Electronics, Information and Communication Engineers, Mar. 25, 1992, No. J75-D-II, 3, pp. 565-572.

* cited by examiner

*Primary Examiner*—Vikkram Bali
(74) *Attorney, Agent, or Firm*—McDermott Will & Emery LLP

(57) ABSTRACT

This invention intends to produce a model natural to see in which visual characteristics of an object are reflected upon its form. This invention provides with a modifying unit for modifying at least a part of 3-dimensional form data based on 2-dimensional image data obtained by photographing the object. The modifying unit extracts a specified area from the 2-dimensional image data according to a setting condition and modifies a part of the 3-dimensional form data corresponding to that specified area. According to the modified 3-dimensional form data, a model is produced. As an object for photographing, for example, the head of the human being is used. In this case, the specified area corresponds to at least one of the hair, forehead, eyebrows, eyes, irises and lips.

24 Claims, 33 Drawing Sheets

1 SOLID MODEL PRODUCTION APPARATUS

DATA PROCESSING APPARATUS FOR PROCESSING A 3-DIMENSIONAL DATA OF AN OBJECT AND A METHOD THEREFOR

BACKGROUND OF THE INVENTION

This application is based on Japanese Patent Application No. 327961/1997 filed on Nov. 28, 1997, 350394/1997 filed on Dec. 19, 1997, 358860/1997 filed on Dec. 26, 1997, 358861/1997 filed on Dec. 26, 1997, 118091/1998 filed on Apr. 28, 1998, and 137912/1998 filed on May 20, 1998, the contents of which are incorporated herein by reference.

1. Field of the Invention

This invention relates to a data processing apparatus for processing a 3-dimensional data for producing a model of an object existing and a method therefor, the apparatus and method being applied for, for example, production of a head model of a human being.

2. Description of the Prior Art

A portable non-contact type 3-dimensional measuring apparatus (3-dimensional camera) has been commercialized and widely used for data entry into the CG system or CAD system, a physical measurement, and a robot visual recognition. The slit light projection method (light-section method) is generally known as the non-contact type measuring method, while the pattern light projection method, stereo view method and interference pattern method are well known as well.

Further, a 3-dimensional CG software available in a personal computer and a small 3-dimensional cutting machine for hobby have been marketed. By using these, a model or an art piece can be produced easily at home.

On the other hand, a kind of vending machine for producing a photo sticker of a customer's face on site has been attracting public attention. The customer throws in a coin for charge and takes a desired pose in front of a camera watching a monitor screen. Then, by carrying out a predetermined operation, a sheet containing the predetermined number of stickers is discharged into a discharge port. Most machines have a plurality of choices upon face photo shape, copy pattern and the like.

According to the aforementioned 3-dimensional measuring apparatus, various forms including a human being can be converted to data as easily as when taking a picture. Because this is the non-contact type, an object person does not feel inconvenience even when a physical measurement is carried out. Then, it can be considered that this 3-dimensional measuring apparatus is applied to the production of not a face photo but a face solid model. That is, by combining the 3-dimensional measuring apparatus with a 3-dimensional processing unit, it is possible to measure a human face and produce the solid model of an appropriate magnification on site.

However, in the non-contact type 3-dimensional measuring, of the face elements, an element which is not discriminated from others in form viewpoints is not reproduced on the model. For example, although an iris in an eyeball are important elements which characterize the face, it is not discriminated from the white of the eye. An eyebrow drawn with an eyebrow pencil is also assimilated in the forehead.

On the other hand, a person sometimes may feel a sense of disharmony on his or her solid model in which undulations of his or her face are reproduced faithfully. Sensing the undulation is affected by color as if the lips of warm color look swollen more than actually. Even if the form of the model is reproduced faithfully, a non-color model looks more flat than a familiar face. A model in which a certain face element is intentionally exaggerated is sometimes wanted or a model whose nose is raised more than a real nose is sometimes pleased.

That is, when a face model of a human being is produced, of the form models obtained by the 3-dimensional measuring, such face elements as the eyes, irises, lips and nose need modifying processing.

Irrespective of the non-contact type or contact type, it is difficult to measure hair one by one accurately. Even if an accurate measurement is achieved, the portion measured is processed in a flat plane if resolution for processing is not high enough. Even if an accurate processing is achieved with a processing unit having an ability of a high resolution, the produced undulation is minute so that it looks flat at a glance. In any cases, there is a problem that the hair portion of the face model is so flat that a hair texture cannot be obtained.

To solve this problem, it can be considered to provide with an undulation pattern like hair. However, it is necessary to properly determine a portion of a model to which that undulation pattern should be attached.

If a model is produced faithfully based on the 3-dimensional measuring, as shown in FIG. 33, the front hair portion drooping over the forehead is an unnatural shape such as a thin plate projected from the forehead. Particularly if an end of the front hair portion is apart from the forehead, a bottom edge of the projected plate forms straight like a hood, thereby making the shape further unnatural.

Although it can be considered that the front hair portion is reproduced by hollowing the projected plate portion, it is undesirable to reproduce the hair, the end of which floats, from the viewpoint of the mechanical strength of the model. Further, such a processing is very hard and takes much time to process.

Particularly, in the optical 3-dimensional measuring method by projecting a reference light such as a slit light, the hair portion of the human being may not be able to be measured accurately. That is, because black hair has a low reflectivity of the reference light, an amount of light received by a range finder becomes insufficient so that a measured value is likely to be missed. Further, an influence of the hair style is extreme. Therefore, upon production of a form model of a human head, there is a problem that the hair portion is reproduced incompletely or not reproduced.

SUMMARY OF THE INVENTION

Accordingly, a purpose of the present invention is to make it possible to produce a model seen as natural by reflecting visual characteristics of an object on a form.

Another purpose of the invention is to make it possible to produce a model exaggerated as required.

To achieve the purposes above, the present invention comprises a modifying unit for modifying at least a part of 3-dimensional form data with reference to 2-dimensional image data obtained by photographing an object. The modifying unit extracts a specified area from the 2-dimensional image data according to a setting condition and modifies a part of the 3-dimensional form data corresponding to the specified area.

According to the modified 3-dimensional form data, a model is produced. As the object for photographing, for example, the human head is used. In this case, the specified area corresponds to at least one of the hair, forehead, eyebrows, eyes, irises, and lips.

In this specification, a distance image refers to a group of picture elements, the value of which indicates a distance and distance distribution is expressed by the picture element value therein. Because the distance image can be handled in the same manner as the 2-dimensional image upon analysis of the spatial frequency, the 3-dimensional unevenness can be analyzed without carrying out 3-dimensional coordinate operation by analysis of the spatial frequency of the distance image. The distance image and 2-dimensional image do not necessarily have to be visualized. The image mentioned here refers to a concept including a image data.

Various processings according to the present invention can be achieved by a hardware circuit using various electronic devices, computer or microprocessor for executing a program or a combination thereof. Upon material processing for production of the model, for example, a milling machine and other cutting machines such as a laminated forming machine, laser beam machine, molding machine, and electrical discharge machine may be used.

DESCRIPTION OF THE PREFERRED EMBODIMENTS

First Embodiment

According to a first embodiment, a portion necessary to be modified is specified based on 2-dimensional photograph information of an object or both the 2-dimensional photograph information and a distance image obtained by 3-dimensional measurement. According to this embodiment, a model which reflects a visual characteristic of the specified portion is generated. Or a model in which a local portion is stressed is generated. The positions of, for example, the eyes and eyeball are expressed in each form. The eyebrow drawn by an eyebrow pencil is also expressed in a form. The undulations of the nose and lips are stressed.

U.S. Pat. No. 5,668,631 is cited in which a basic structure for generating a 2-dimensional image data or a 3-dimensional form data is disclosed.

Figure 1:
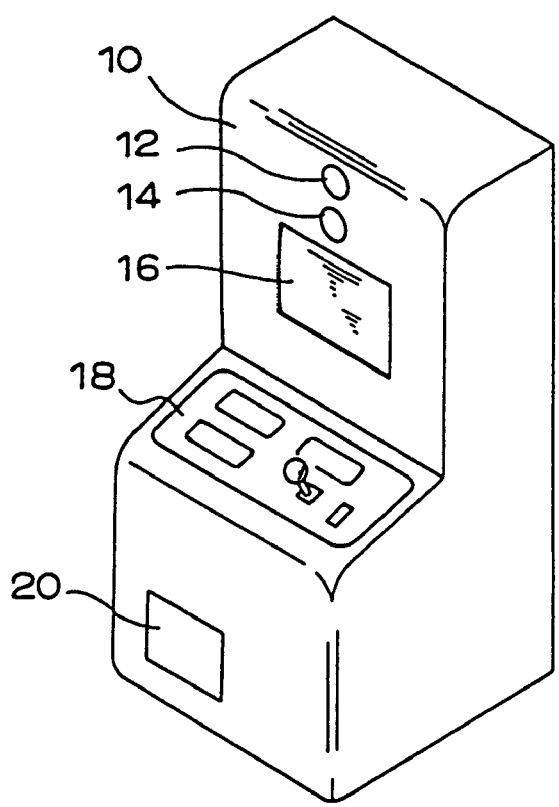
FIG. 1 is an appearance of a solid model production apparatus according to a first embodiment.

FIG. 1 is an appearance of a solid model production apparatus according to a first embodiment.

As shown in FIG. 1, a 3-dimensional model production apparatus 1 has a function for measuring a form of an object and processing material just on site according to its measuring data, and is used as an automatic vending machine for selling a product imitating the face of a customer. The product is a solid model in which a face model projects from a plate of a predetermined shape (e.g., square). That plate (background portion) can be provided with a specific undulating pattern. If an appropriate metal fixture is attached to such a product, it is available as an accessory such as a pendant, broach and key holder. It is permissible to preliminarily attach such a metal fixture to a material.

On a front surface of an upper half portion of a case 10 substantially as high as a man, a light projection window 12 and a light receiving window 14 for optical type 3-dimensional measuring and a display 16 for a customer to confirm his or her pose are provided. The light receiving window 14 is used for 2-dimensional color photographing. A lower half portion of the case 10 is projected forward compared to the upper half portion and an operation panel 18 is provided on its upper surface. A product take-out port 20 is provided on a front panel of the lower half portion.

Figure 2:
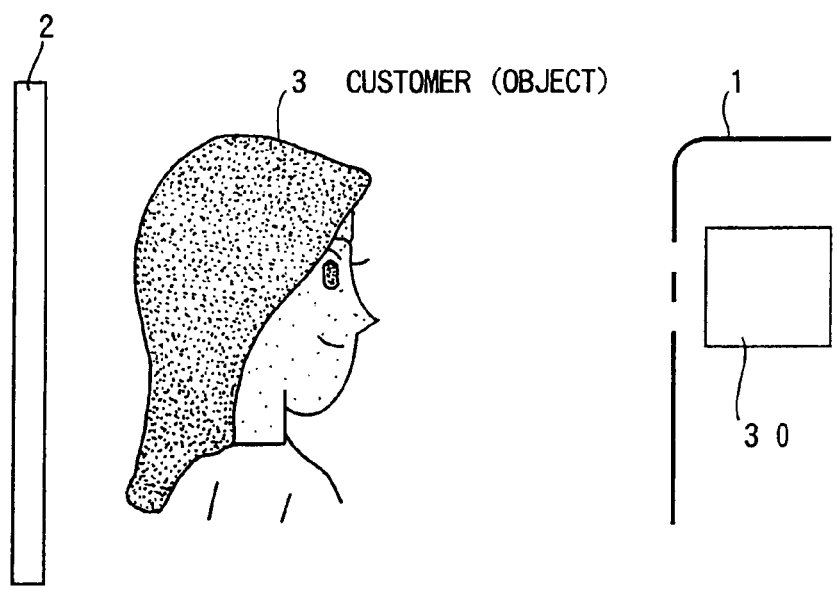
FIG. 2 is a diagram showing a state of use of the solid model production apparatus.

FIG. 2 is a diagram showing a state of use of the solid model production apparatus.

As shown in FIG. 2, a background sheet 2 such as a sheet colored blue is disposed in front of the solid model production apparatus 1. A customer 3 stands facing the solid model production apparatus 1 with the background sheet 2 in the back and throws in coins for charge. Then, if the customer 3 performs start operations, the solid model production apparatus 1 measures a form of an object existing within a specified range of the front and displays a 3-dimensional form model (e.g., a surface model) indicating a measuring result. If the customer 3 performs confirmative operations to make sure determining of a composition, the solid model production apparatus 1 starts 3-dimensional processing according to the measuring result. A product is completed in a few minutes. The customer 3 picks up the product from the product take-out port 20.

Figure 3:
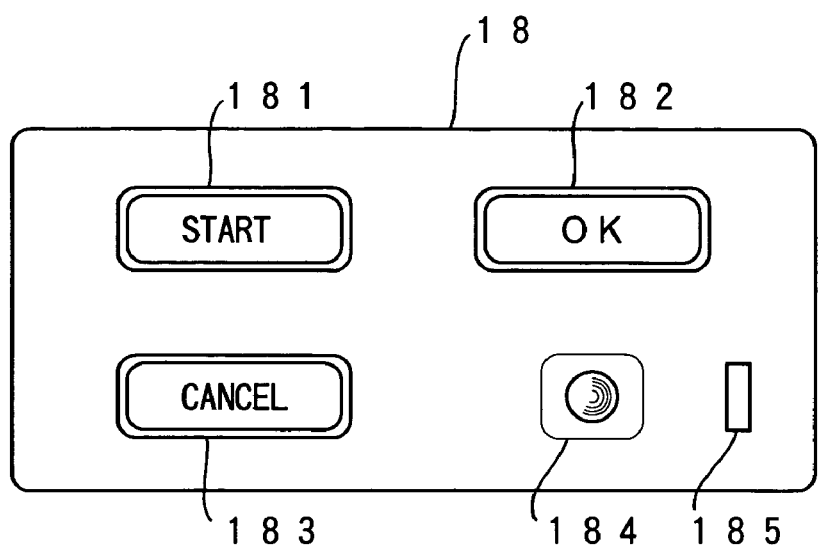
FIG. 3 is a plane view of an operation panel.

FIG. 3 is a plane view of an operation panel.

An operation panel 18 shown in FIG. 3 comprises a start button 181, a confirmation button 182, a cancel button 183, a joy stick 184, and a coin slot 185. The start button 181 is a start operation means and the confirmation button 182 is a confirmative operation means. The joy stick 184 is used for instruction of a change in the composition of a model. A rotation processing for the 3-dimensional form model is carried out according to a pan operation for inclining the joy stick 184 to the right and left, tilt operation for tilting it relative to a vertical direction and roll operation for rotating a knob, and a processing result is indicated each time of the operations. The cancel button 183 is an operation means for instructing a remeasurement when the customer 3 is not satisfied with the displayed 3-dimensional form model. However, the effective frequency of use of the cancel button 183 is set and the remeasurement cannot be instructed without any limit.

Figure 4:
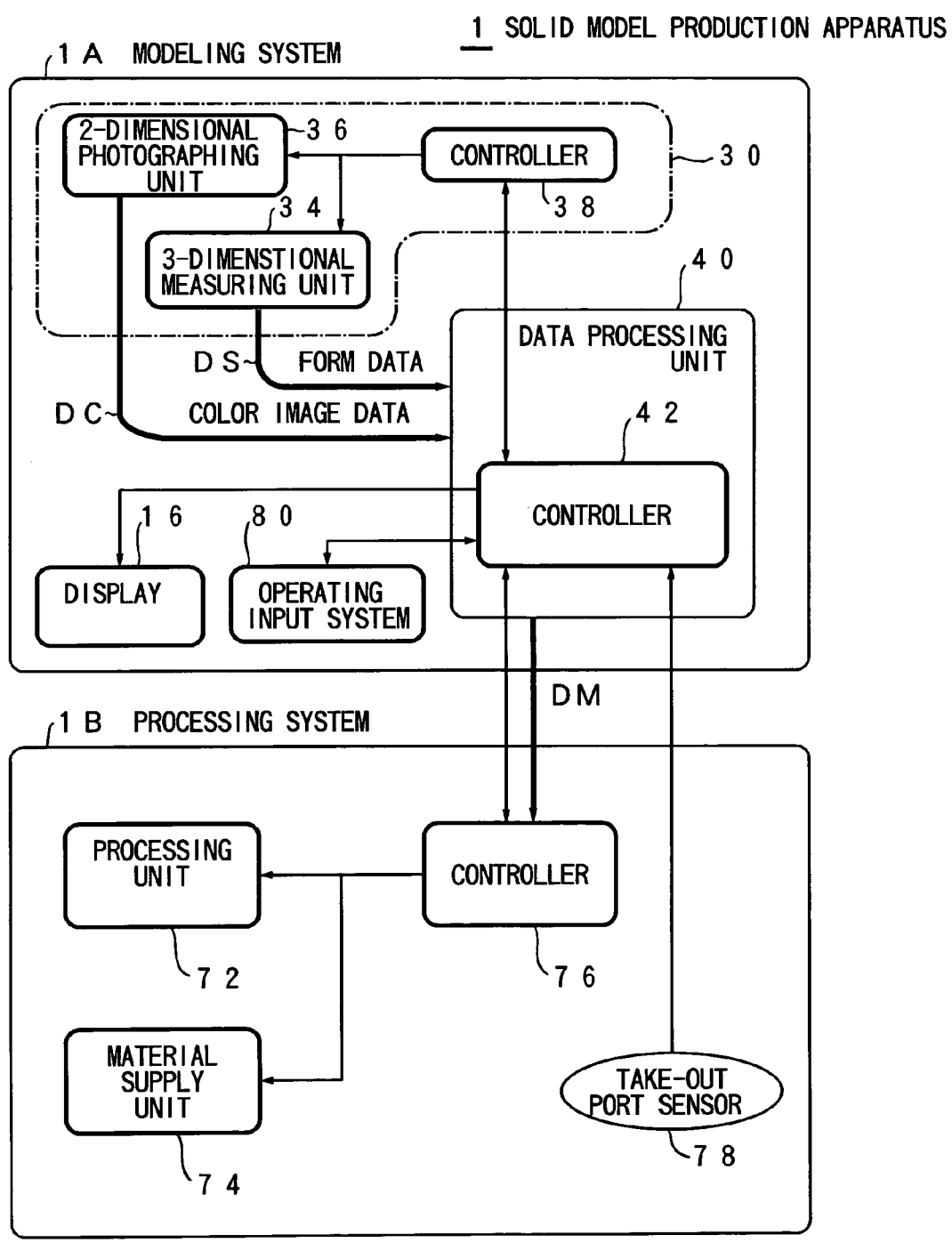
FIG. 4 is a block diagram showing the solid model production apparatus in views of the function.

FIG. 4 is a block diagram showing the solid model production apparatus in views of the function.

As shown in FIG. 4, the solid model production apparatus 1 comprises a modeling system 1A for generating a 3-dimensional form model of a product size and a processing system 1B for embodying the 3-dimensional form model.

The modeling system 1A includes a photographing system 30 for converting appearance information of the customer 3 as an original object to digital data. The photographing system 30 includes a 3-dimensional measuring unit 34 for converting form information to data by the slit light projection method, a 2-dimensional photographing unit 36 for converting color information to data, and a controller 38. It is permissible to use other method for the 3-dimensional measuring instead of the slit light projection method. A form data DS which is measuring information by the 3-dimensional measuring unit 34 and color image data DC which is photographing information by the 2-dimensional photographing unit 36 are input to a data processing unit 40.

Because a relationship between the 3-dimensional measuring and 2-dimensional photographing has been well known, it is easy to match the position of the 3-dimensional form model based on the form data DS with that of 2-dimensional photographed image. The 3-dimensional input device is composed as disclosed in Japanese Patent Laid-Open (A) No. 9-145319, the 2-dimensional photographing and 3-dimensional measuring on the same point can be easily performed, so that the position matching can be executed more easily. The data processing unit 40 includes an image processing circuit (not shown) and carries out various data processing including a data modification peculiar to this embodiment. A controller 42 of the data processing unit 40 conducts an entire control on the solid model production apparatus 1 and sends an appropriate instruction to the controller 38 of the photographing system 30 and a controller 76 of the processing system 1B. The display 16 and an operating input system 80 are connected to this controller 42. The operating input system 80 comprises the aforementioned operation panel 18 and a charge receiving mechanism.

On the other hand, the processing system 1B comprises a processing unit 72 for cutting material such as resin block, a material supply unit 74 for supplying material to a processing position and transporting a processed product to the product take-out port 20, a controller 76 and a take-out port sensor 78. A detection signal of the take-out port sensor 78 is input to the controller 42.

Meanwhile, it is permissible to utilize a structure having no controllers 38 and 76 by entrusting the controller 42 with a control on the photographing system 30 and processing system 1B.

Figure 5:
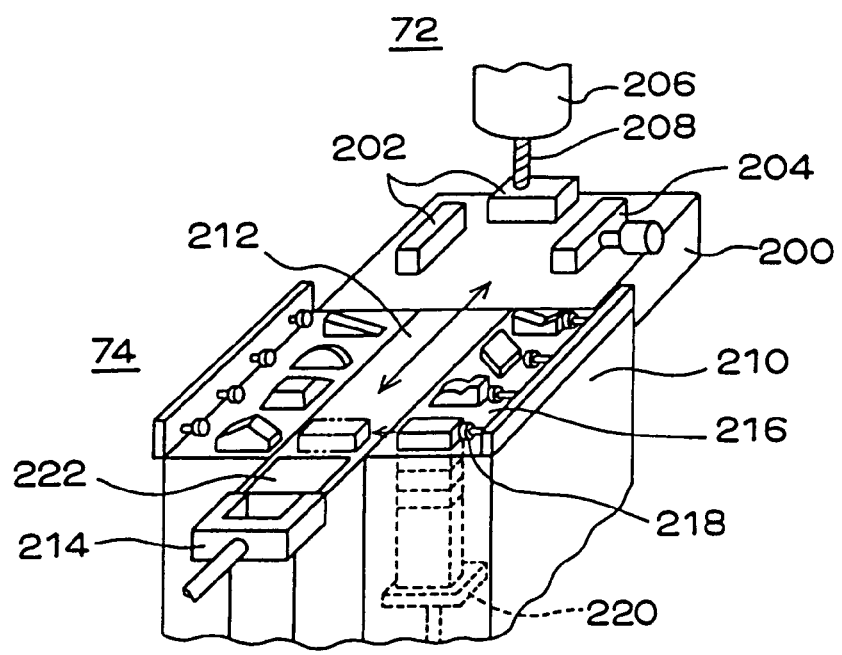
FIG. 5 is a perspective view showing an example of a processing system mechanism.

FIG. 5 is a perspective view showing an example of a processing system mechanism.

As shown in FIG. 5, the material supply unit 74 includes a stock portion 210 for storing materials of 8 types of forms. Storage space is provided on each of both sides of a straight-line transportation path 212 and four elevators 220 are arranged in each storage space along the transportation path 212. A plurality of materials of the same type are stacked on each elevator 220 and the elevator 220 is lifted upward/downward so as to locate the topmost material at a predetermined height. If a kind of material suitable for a model to be produced is specified, the specified material is carried as a work 216 to the transportation path 212 from the storage space by a push rod 218. The work 216 on the transportation path 212 is sent to a table 200 of the processing unit 72 by a chuck-provided transportation rod 214.

The work 216 is fixed to the table 200 by two stoppers 202 and a clamp jig 204. Then, the work 216 is cut by a blade 208 mounted on a rotary shaft 206 capable of moving vertically, to the right/left and up/down.

After the 3-dimensional cutting is terminated, the work 216 is nipped by the chuck provided at an end of the transportation rod 214, carried to a discharge end portion of the transportion path 212 thereby and sent into a discharge port 222. Instead of the chuck provided at an end of the transportation rod 214, the work 216 may be moved from the table 200 to the discharge port 222 through a slide.

The structure of the processing system 1B is not restricted to the example mentioned above. For example, it is permissible to use a structure in which the materials of the same kind are arranged on each shelf of rack having multiple racks horizontally, an elevator is disposed on an end along the arrangement direction and then the material is pushed from the shelf to the elevator. As a result, the number of the elevators can be reduced. It is also permissible to transport by an arm robot the work to the storage position, processing position and discharge position successively. Instead of the cutting, the model may be produced by laminated forming method (including optical forming method), laser processing (heat processing) and molding (e.g., pressure molding). Further, as for the material shape, it is permissible to use a structure allowing the customer 3 to select a desired shape, or a structure allowing to automatically select a face model requiring the shortest time for processing from among a plurality of materials roughly molded to standard faces preliminarily.

In the solid model production apparatus 1 having the above described structure, data modification for automatically modifying a 3-dimensional form model obtained by 3-dimensional measuring by using color photographing information of the face is carried out by the data processing unit 40 to produce a face model having undulations expressing the iris and eyebrow and having the nose and lips stressed.

Figure 6:
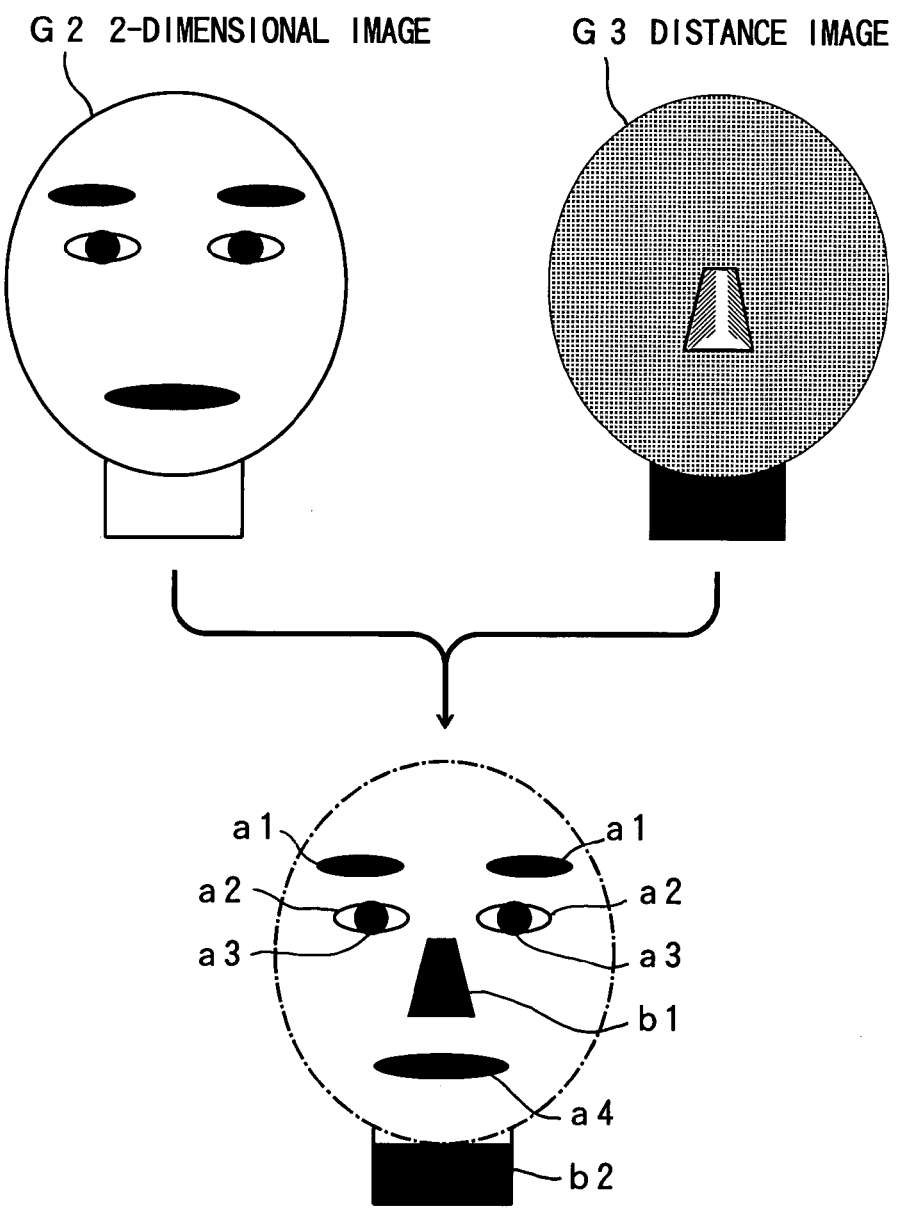
FIG. 6 is a schematic view for extraction of face elements.

FIG. 6 is a schematic view for extracting face elements.

The data processing unit 40 extracts specific face element areas from a 2-dimensional image G2 expressed by color image data DC and from a distance data G3 expressed by form data DS. According to this embodiment, the eyebrows, irises, and lips are extracted from the 2-dimensional image G2, because the undulations of these face elements are minute and difficult to be extracted from the distance data G3. On the other hand, the nose and neck are extracted from the distance data G3, because the nose has a similar color as its surroundings (e.g., cheek) so that it is difficult to extract from the 2-dimensional image G2. The same can be said about the neck.

The extraction from the 2-dimensional image G2 is carried out in such manner as follows:

① By clustering a particular color space (e.g., L* a* b* color space), the 2-dimensional image G2 is divided to the same hue areas.

② By labeling on its result, a continuous area having the same hue is extracted.

③ By matching using a template produced based on statistics about positions and colors of the face element, characteristic areas a1, a2, a3, and a4 corresponding to the eyebrows, eyes, irises, and lips are selected.

For example, if a portion below the lower lip is shaded and therefore darker than it is originally, a boundary between the red lip and shade and a boundary between the shade and skin color jaw are extracted, and a virtual line passing through an intermediate portion between these boundaries is obtained and this virtual line is adopted as a part of the contour of the lower lip. That is, as for the shade portion, its area is divided with reference to the color information of the surroundings.

The extraction from the distance data G3 is carried out in such manner as follows:

① By clustering about distribution of the distance from a 3-dimensional measuring reference point, the distance data G3 is divided to areas within the same distance range.

② By labeling its result, continuous characteristic areas (corresponding to the nose and neck) b1 and b2 within the same range are selected.

Figure 7:
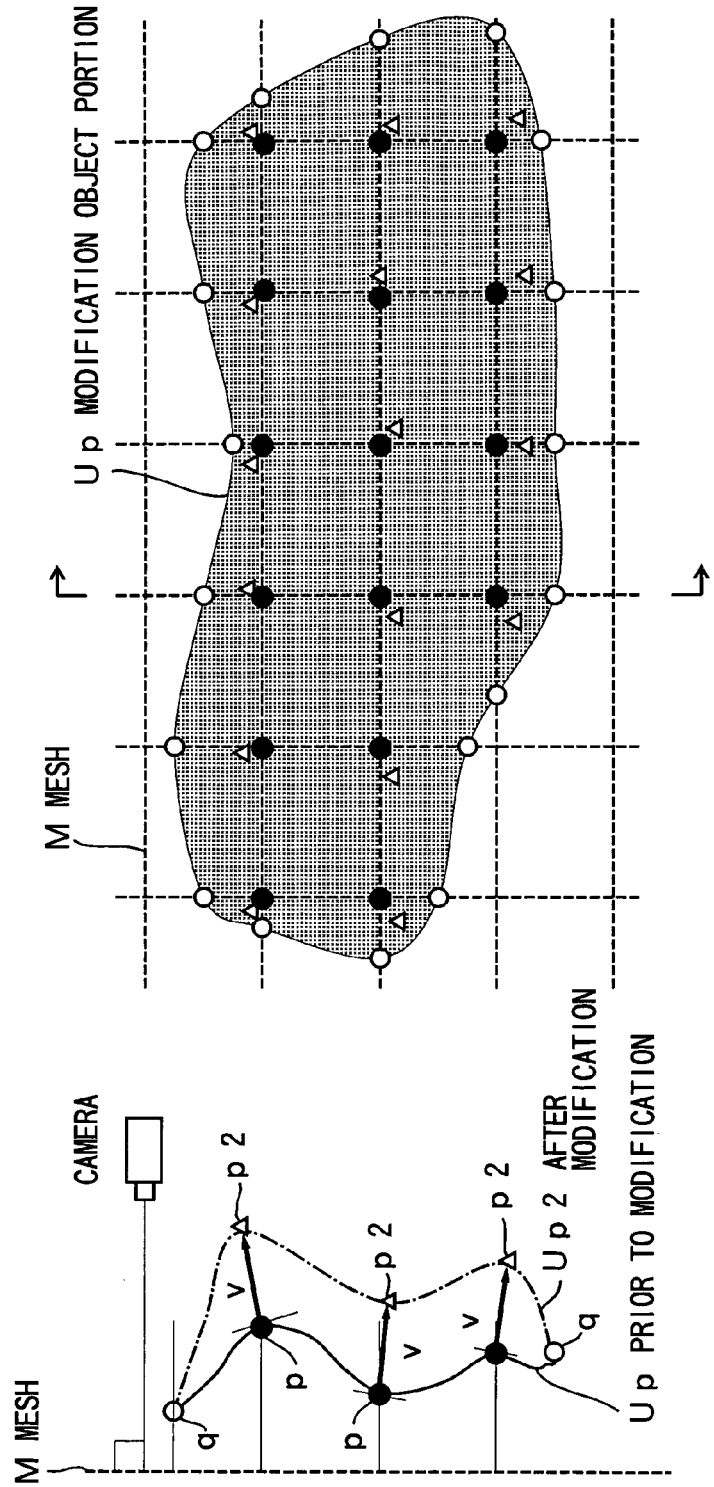
FIG. 7 is a schematic view for partial data modification.

FIG. 7 shows a schematic diagram of partial data modification. First of all, of the 3-dimensional form model specified by the form data DS, the characteristic areas a1–a4 of class 1 extracted from the 2-dimensional image G2 in the manner above and the characteristic areas b1 and b2 of class 2 extracted from the distance image G3 are set as objects for modification. Each object Up for modification is subjected to modification of a predetermined extent. The modification is carried out in such manner as follows:

① A mesh M perpendicular to the line of vision of a camera is projected over an object Up for modification and positions on which each lattice point of the mesh M is projected of the object Up for modification are assumed to be a sampling point p.

② A modificative vector v having a set length, which directs toward a camera with respect to the sampling point p and is perpendicular to a model surface is calculated. The length of the modificative vector v is set depending on each face element. For example, the length of the eyebrow is longer that that of the eye.

③ An intersection (called a contour point) q between the mesh M and contour of the modification object Up is obtained.

④ A curved surface passing a position (end point) p2 of a front end of a modificative vector v and contour point q is obtained.

⑤ The obtained curved surface and the original 3-dimensional form model are synthesized with each other. Of the 3-dimensional form model, the modification object portion Up is replaced with the obtained curved surface Up2.

As a result, the modification object portion Up is swollen so that, for example, the positions of the eyes and irises are expressed with their particular shapes. The same is applied to eyebrows drawn with an eyebrow pencil. The undulations of the nose and lips are stressed. Further, the neck is assimilated with the background. Because the position of the contour point q is not changed, continuity of the surface among the eyebrow, irises and their surroundings is maintained.

Hereinafter, an operation of the solid model production apparatus 1 will be described with reference to a flow chart.

Figure 8:
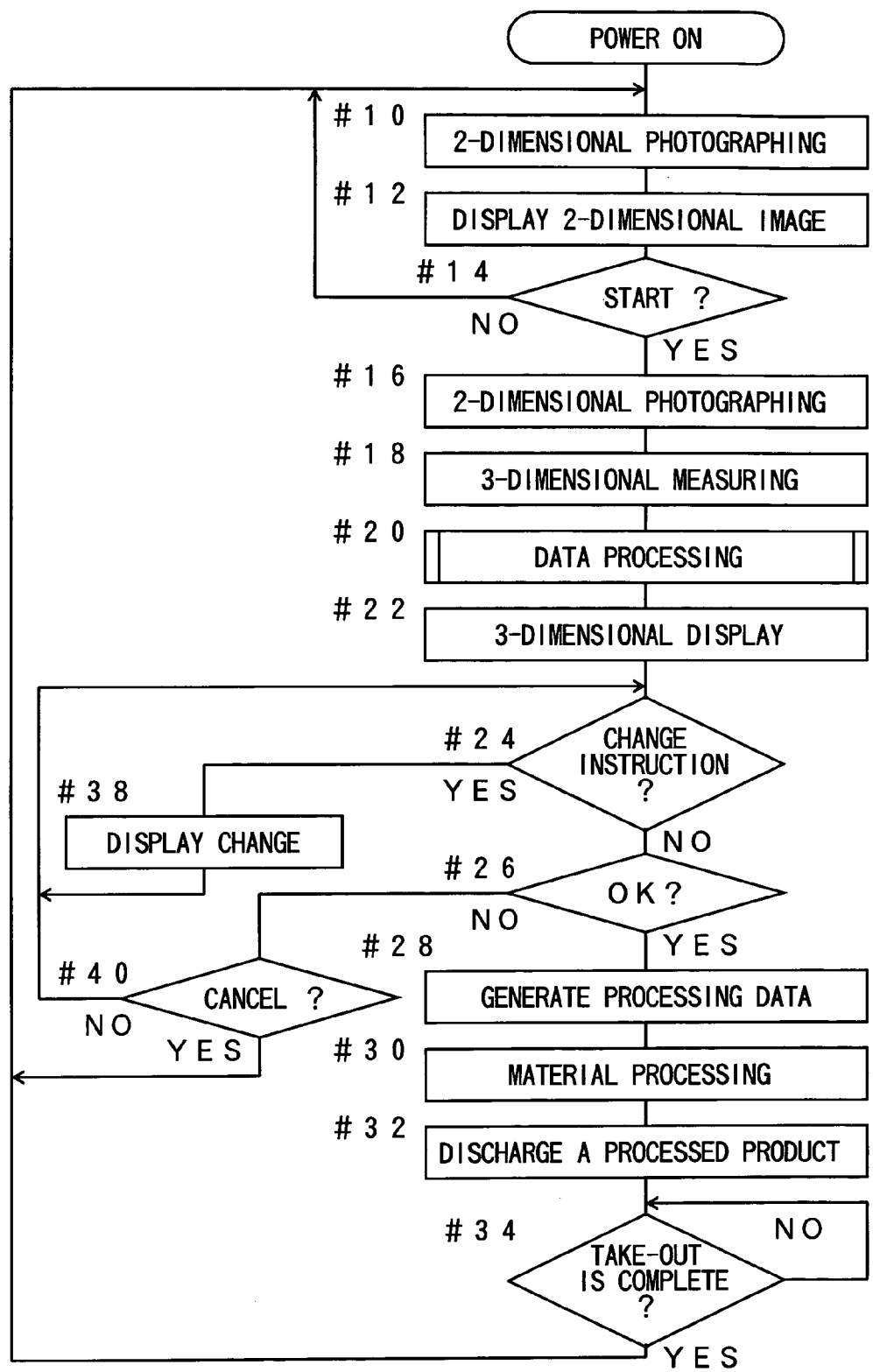
FIG. 8 is a flow chart showing an outlined operation.

FIG. 8 is a flow chart showing an outlined operation.

As shown in the flow chart of FIG. 8, in a standby period for waiting for an operation by a customer 3 after the power is turned on, the 2-dimensional photographing and a display of a photographing result are repeated (#10, #12, and #14).

Additionally, a guide message is displayed periodically. If a fee is thrown in and the start button 181 is pressed, the 2-dimensional photographing is carried out newly and the 3-dimensional measuring is carried out (#16 and #18). A predetermined data processing is carried out (#20) and the obtained 3-dimensional form model is displayed (#22). At this time, a known graphic technique such as providing with a shade is used to make a good show. Then, this processing waits for a next instruction. However, the waiting time is limited and if the limit time is passed, it is deemed that a recognizing operation has been performed.

If the joy stick 184 is operated, the 3-dimensional model is rotated depending on the operation as described above (#24 and #38). If the cancel button 183 is pressed, the operation returns to standby period operation (#40 and #10). However, in this case, the customer 3 does not have to thrown in a coin for charge, and only if the start button 181 is pressed, the remeasurement is carried out.

If the confirmation button 182 is pressed (#26), processing control data is generated with reference to processing condition database based on the 3-dimensional form model (#28). Then, material processing is carried out (#30).

If the processing is finished, a product is discharged (#32) and then, the take-out port sensor 78 confirms that the product has been taken out, and then, the operation returns to standby operation (#34 and #10).

Figure 9:
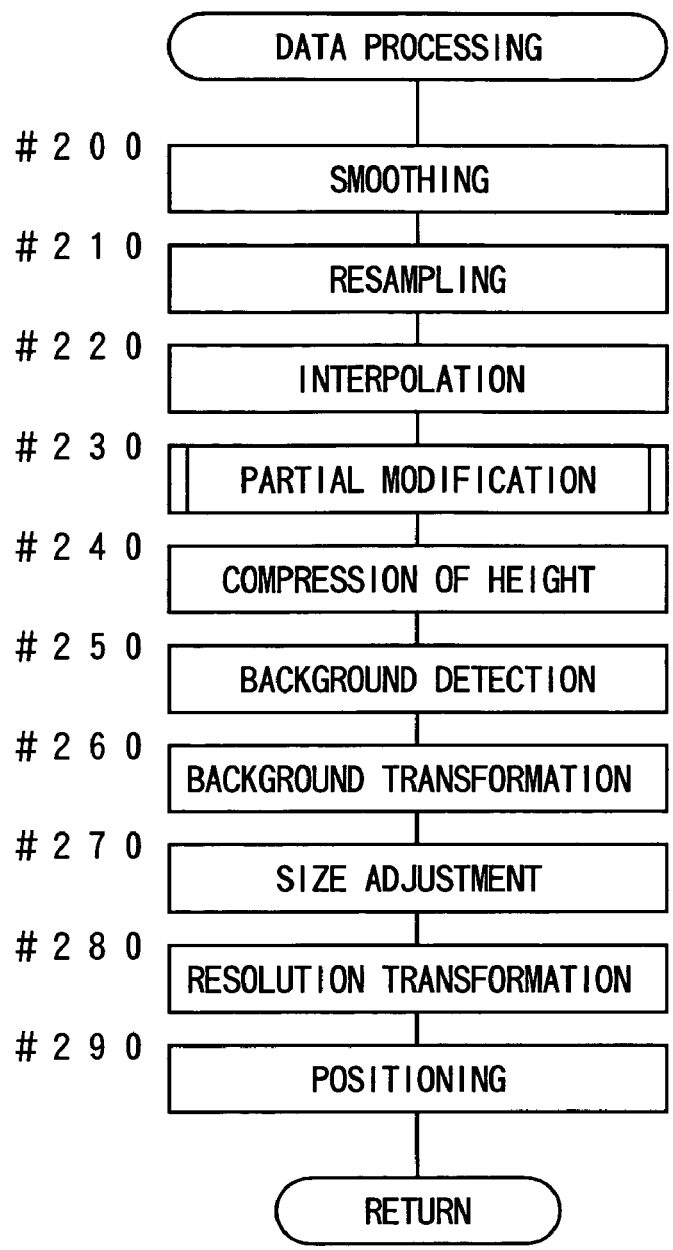
FIG. 9 is a flow chart showing a content of data processing at step #20 of FIG. 8.

FIG. 9 indicates a detailed content of the data processing at step #20 described above. Here, the following processings including the data modification for inducing a partial undulation as described above, shortening of processing time and compression of the depth direction for intentionally flattening are carried out.

First, smoothing processing is carried out to remove abnormal data due to noise and avoid an excessive representation of fine unevenness (#200). Resampling processing is carried out (#210). This is a processing for converting to data arranged by the lattice points having the same interval projected in parallel from a certain direction to make input data face properly in the processing direction.

For example, in case a portion below the ear of the face cannot be measured because there is a shade, after 3-dimensional measuring with the face upward is carried out, it is possible to convert data so as to express the face which directs in a normal forward direction. If there is no measuring point at a position in which the lattice point is projected, linear interpolation is carried out by measured values therearound. At this time, the projecting direction is upward in the perpendicular direction upon processing, and the respective lattice points wait for height data. Even if the input data depends on perspective projection, the input data can be converted to parallel projecting data by this processing.

A data missing portion is interpolated (#220). As the interpolation method, linear interpolation, weighted interpolation and other various methods are available. For example, all the portions missing data are replaced with fixed values (simple interpolation). As the fixed value, a set value, a minimum height and an average value of face peripheral positions can be considered. If the data missing portion is completely surrounded by effective data portion, it is linearly interpolated with surrounding data. In case it is estimated that no accurate data can be obtained by optical 3-dimensional measuring because of the character of an object such as the black eyebrow and hair in the human face, that data may be replaced with existing 3-dimensional form data. In this case, the standard model for the face (front half face of the head) is prepared and for the data missing portion, the standard model data the position and size of which are adjusted is used. The adjustment of the standard model is carried out in a following procedure. In the same way as the aforementioned data modification, the eyes and mouth are extracted from the 2-dimensional image and the positions of these three reference points are calculated.

Then, the linear conversion of the standard model is carried out to make the respective reference points of the standard model coincide with actually measured form model. Such a synthesis can be applied to any portion as well as the missing portion of the face.

After a 3-dimensional form model faithful to a real form is obtained by the aforementioned respective processings, the eyebrows and irises are embodied and data modification for stressing the lips and nose particular to this embodiment is carried out (#230). It is permissible to only embody the eyebrows and irises without stressing the lips and nose. It is possible to provide with a mode selection function so that the customer 3 or unit controller can select whether or not the data modification should be carried out and if it is done, which portion (face element) should be modified.

Next, height compression processing is carried out to shorten the 3-dimensional form model in the depth direction (#240). That is, a difference in height in the depth direction is reduced so as to shorten processing time. For application to the pendant and medal, a flat model is suitable. For the compression, both equal compression and unequal compression are applicable and they can be selected for each part.

A background portion of the 3-dimensional form model is detected (#250). This is a pretreatment for modifying the background portion. If a result of color discrimination of the 2-dimensional image is applied with the background of the customer as a blue back, detection of the background is made easily and securely.

Background conversion in which the background portion is replaced with other data is carried out (#260). For example, because the background portion has an extreme depth, that data is converted to data having a shallow depth to reduce processing time. The replacement data may be flat data or solid data expressing pattern of flowers and tree or geometric pattern.

Size adjustment for making a real 3-dimensional form model to a product size is carried out (#270). Further, resolution conversion for making a data quantity coincide with an accuracy of the processing unit 72 is carried-out (#280). In this processing, a mesh of a predetermined lattice interval is projected so as to resample at the lattice points. The projection direction is fixed in a perpendicular direction upon processing. As for the procedure for resolution conversion (data number conversion), first of all, configurational point group of a form model for processing is defined with point—point pitch and vector change quantity, and a point—point pitch range corresponding to the vector change quantity is read from a preliminarily stored characteristic data table and set. That is, excessive data is thrown out to increase the pitch or data is interpolated so as to reduce the pitch. If measuring resolution is large enough, throwing out the excessive data only has to be carried out. If a resolution converting function is provided, because the resolution of the 3-dimensional measuring unit 34 is not limited, such an application state in which the measuring means is changed depending on an application is allowed.

Finally, position matching for moving the home position of coordinate so that the reference position of the 3-dimensional form model coincides with the processing reference position is carried out (#290). In case a material already having a predetermined unevenness is used upon processing, in the processing data generation processing (step #28 of FIG. 8) corresponding to confirmative operation, a cutting amount is calculated by comparing the unevenness of the 3-dimensional form model obtained by the above processing with the predetermined unevenness.

Figure 10:
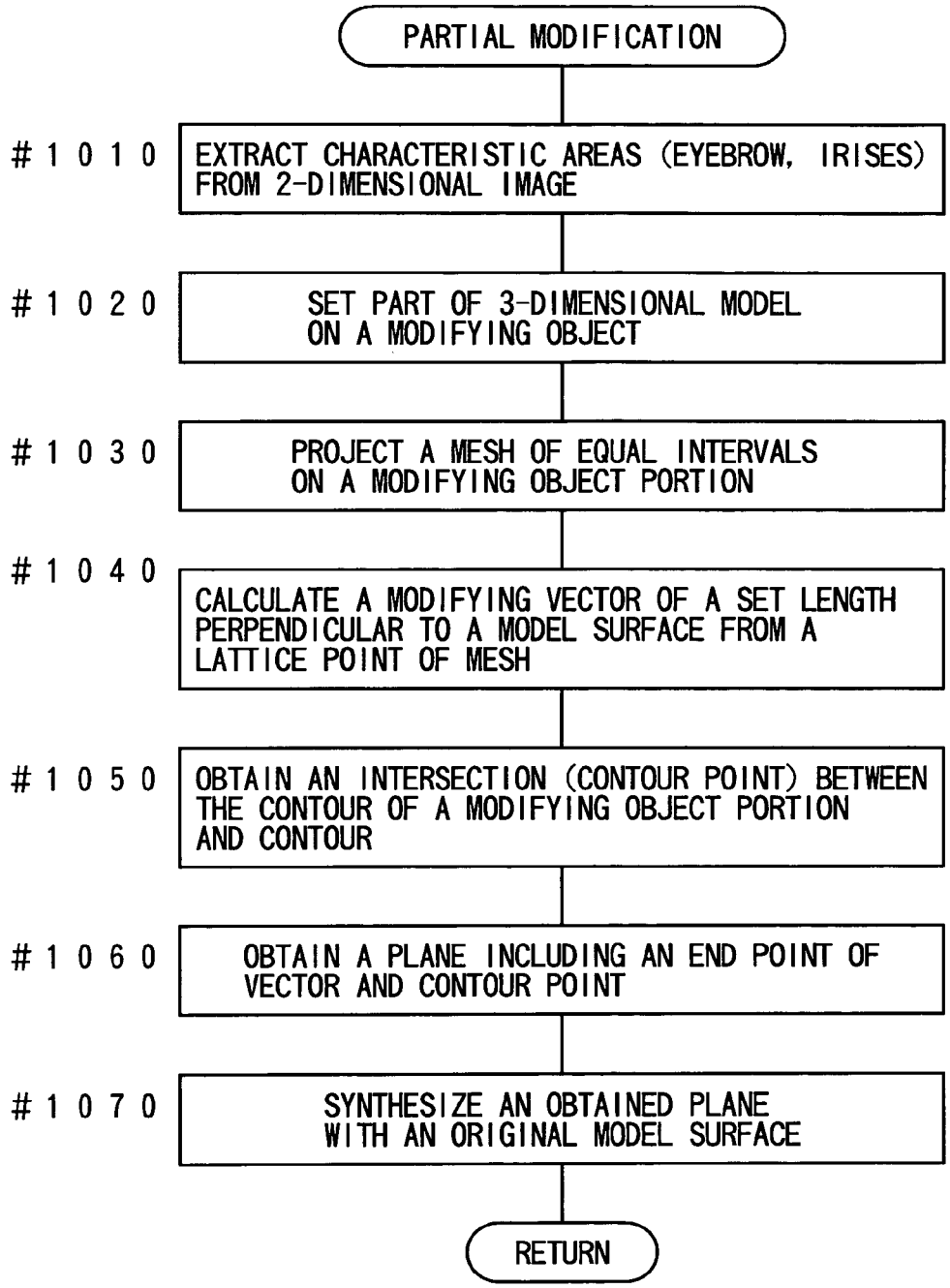
FIG. 10 is a flow chart showing a content of the partial modifying processing at step #230 of FIG. 9.

FIG. 10 shows a detailed content of partial modifying processing of step #230 described above. First, as described in FIG. 6, the class 1 face elements difficult to discriminate such as the eyebrows and irises are extracted from the 2-dimentional image G2 (#1010). The class 2 face elements difficult to discriminate by the color such as the nose and neck are extracted from the distance image G3 (#1020). Any of the class 1 and class 2 may be extracted first and both of them may be extracted in parallel at the same time.

The modifying object portion Up is set in the 3-dimensional form model (#1030), the mesh M is projected and a modificative vector v is calculated (#1040 and #1050). Further, an intersection (contour point) q between the contour of the modifying object portion Up and mesh M is obtained (#1060). Any of the modifying object portion Up and contour point q may be obtained first and arithmetic operation for obtaining these can be carried out in parallel.

Then, a plane including the front end point p2 of the modificative vector v and contour point q is obtained as a modifying portion model (#1070) and the obtained plane is synthesized with its original 3-dimensional form model (#1080).

According to this embodiment, visual characteristics of an object can be reflected on a form so that a model natural to see can be produced. Further, as required, an modified model can be produced.

Although according to this embodiment, the solid model production apparatus 1 presumed to be used as a vending machine is exemplified, the data processing according to this invention is not related to which production of a model is charged or non charged. The model size is not restricted to a reduced size, but a real size or an enlarged size may be applied. An original object may be living thing other than the human being, such as dogs or cats.

Second Embodiment

According to a second embodiment, with reference to the 3-dimensional measuring information (distance image) of an object and 2-dimensional photographing information, a particular portion of the form model is extracted by analysis of spatial frequency of the referred image. Then, that particular portion is subjected to data processing. For example, a hair portion is extracted from a human form model and an undulation pattern expressing hair texture is attached thereto. The data processing includes modification, substitution and texture mapping.

According to the spatial frequency analysis, the hair portion can be specified more securely than the analysis of the color information generally carried out. That is, because the hair color varies and the skin color also varies, the reliability of discrimination between the hair and face is very difficult. On the contrary, a difference in frequency distribution meaning that the hair portion contains more high frequency components than the face portion is an eternal fact and therefore, an error in discrimination is difficult to occur under various conditions.

Concretely, according to the second embodiment, in the solid model production apparatus 1 described in the first embodiment, data modification of the hair is carried out as well as the data modification of the face portion.

That is, according to this embodiment, to produce a face model natural to see in which the hair texture is reproduced, data modification for automatically modifying the 3-dimensional form model obtained by 3-dimensional measuring is carried out by the data processing unit 40. The modification is a processing for attaching a registered striped undulation pattern to the hair portion of the 3-dimensional form model, that is, providing with a number of grooves or striped undulations. Upon this processing, the data processing unit 40 analyzes a distribution of the spatial frequency on the 3-dimensional measuring information (distance image) or color photographing information to specify the hair portion of an object for modification.

According to this embodiment, to make a model more look like its real object, hair wave line of each portion is determined according to the color photographing information and corresponding to the result, the hair portion is divided and then an optimum undulation pattern is attached to each divided area. It is permissible to discriminate a hair style depending on the shape of the hair portion and attach a predetermined undulation pattern evenly irrespective of the real hair wave line.

Figure 11:
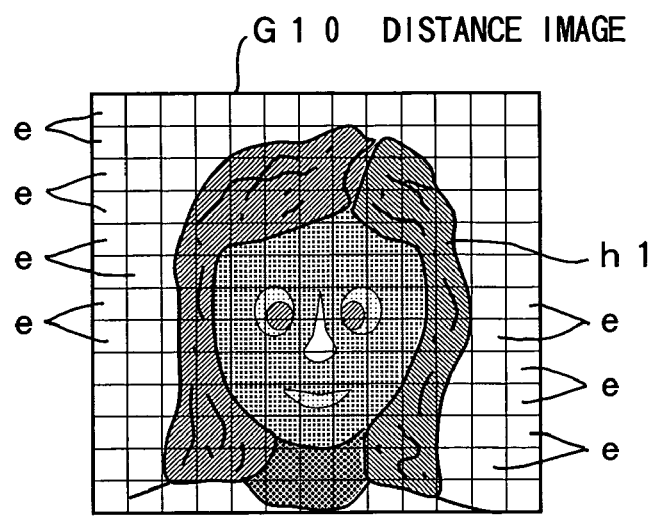
FIGS. 11(A) and 11(B) are diagrams for explaining a specified procedure for the hair portion in a second embodiment.
Figure 11:
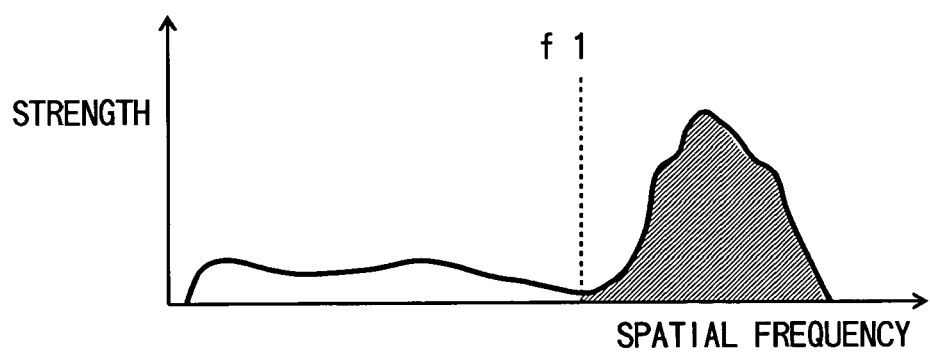

FIGS. 11(A) and 11(B) show a procedure for specifying the hair portion. As shown in FIG. 11(A), the distance image G10 of the head obtained by 3-dimensional measuring on the customer 3 is divided finely to lattices. 2-dimensional Fourier transformation is carried out for each segment e divided finely so as to obtain the spatial frequency spectrum. As shown in FIG. 11(B), integration of spectrum strength is carried out about a range (shadow portion of figure) in the high frequency side relative to the set frequency f1. Then, the segment e in which an integrated value is above the set value is determined to correspond to the hair portion h1. A set of the segments e determined like this is specified to be the hair portion.

Figure 12:
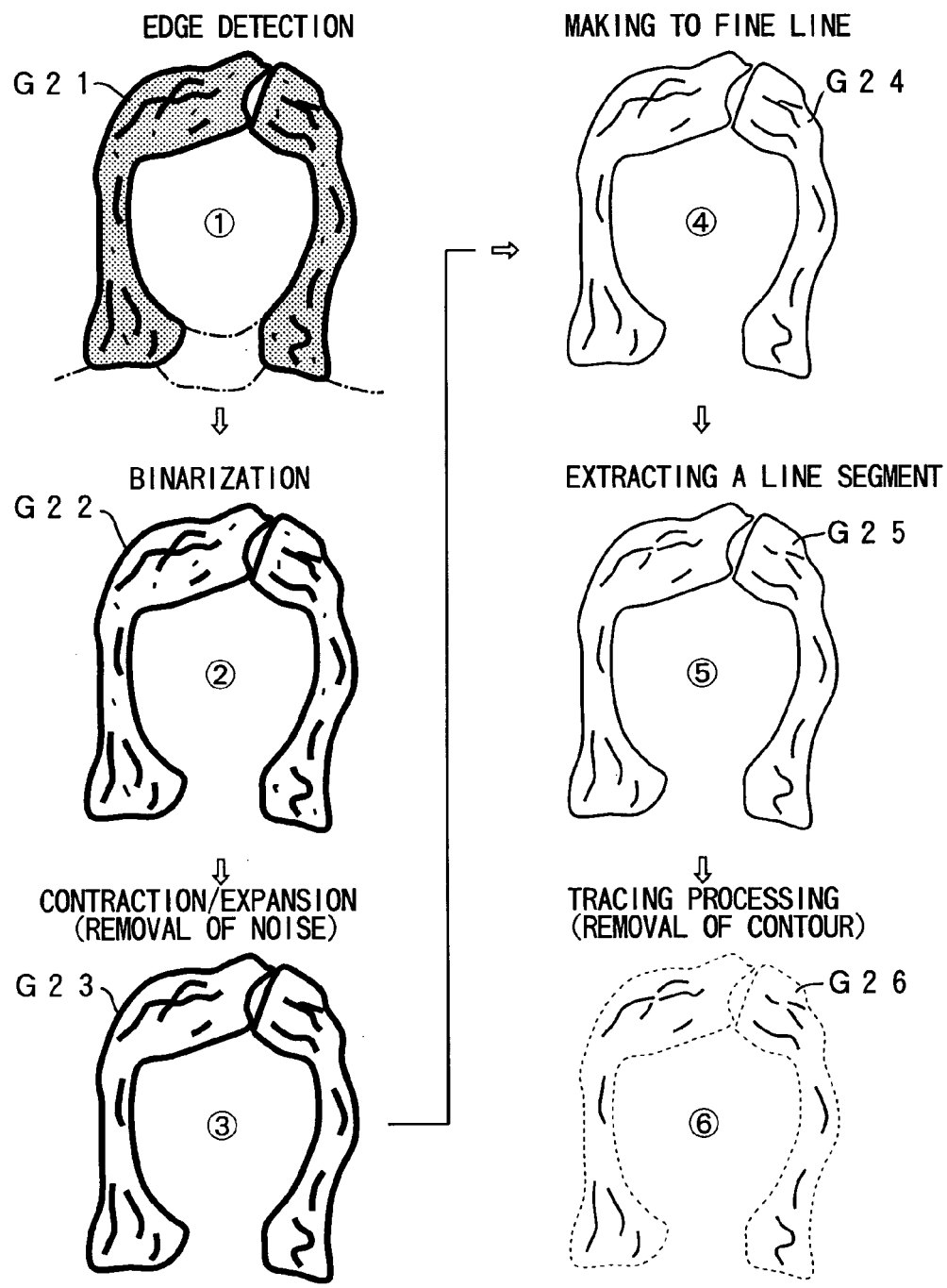
FIG. 12 is a schematic view for extracting hair wave line information.

FIG. 12 shows a schematic view for extracting hair wave line information. The data processing unit 40 extracts a portion corresponding to the hair portion h1 of the distance image G10 specified in the above manner from the 2-dimensional image expressed by the color image data DC, as the hair area.

Next, the hair wave line information is extracted in such manner as follows:

① Differential treatment of first order is executed about the hair area of the 2-dimensional image so as to detect an edge.

② The edge detecting image G21 is binarized within a predetermined threshold.

③ Contraction/expansion is repeated fro the binarized image G22 so as to obtain an image G23 excluding image noise.

④ Four concatenated picture elements and less of a core line are stored to make it a fine line, thereby obtaining an image G24.

⑤ The respective picture elements are classified depending on the concatenated picture element number and by excluding branch point picture elements of concatenation number 3 and intersection picture elements of concatenation number 4, only line segments (line image) comprising only picture elements of concatenation number 1 or 2 are left.

⑥ Tracing processing is carried out for the line segment of the image G25 to remove loop like line segments in which the concatenation number of all picture elements is two, namely the contour of the hair area, thereby obtaining an image G26 indicating the direction of the hair.

Figure 13:
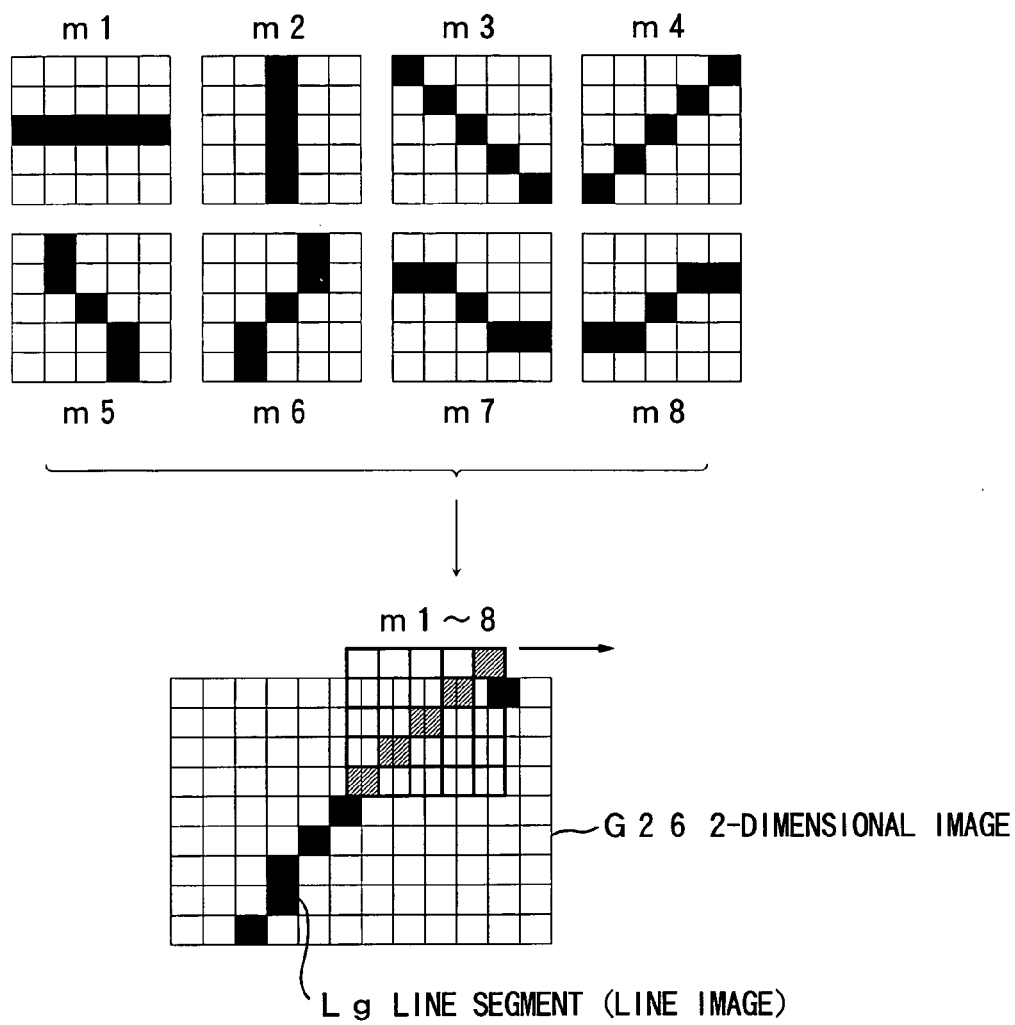
FIG. 13 is a schematic view for classification of the hair wave line.

FIG. 13 shows a schematic view on classification of the hair directions. The data processing unit 40 scans the 2-dimensional image G26 from which the hair wave line information has been extracted in the above manner while carrying out matching between the line segment Lg indicating the wave line and a registered mask pattern m1–8. As a result, a mask pattern having the most coinciding picture elements is determined to be a mask pattern of that portion.

That is, the wave line is classified to any direction of the mask patterns m1–8.

Figure 14:
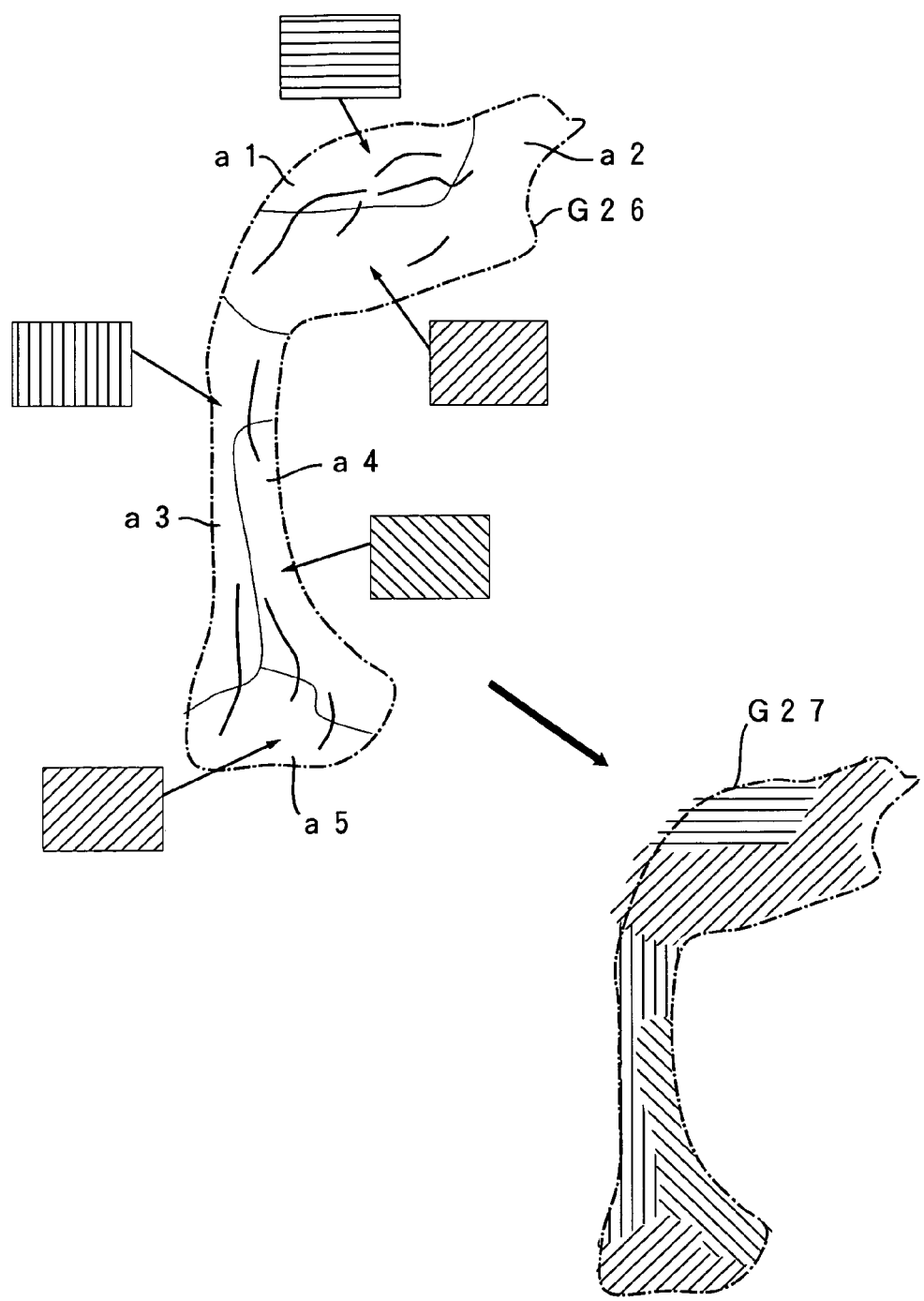
FIG. 14 is a diagram showing an example of setting a striped pattern.

FIG. 14 is a diagram showing an example of setting a striped pattern.

As shown in FIG. 14, the 2-dimensional image G26 of the hair portion is segmented corresponding to a distribution of the mask pattern and the respective segments a1–a5 are filled with each corresponding mask pattern. That is, a hair pattern is set.

Figure 15:
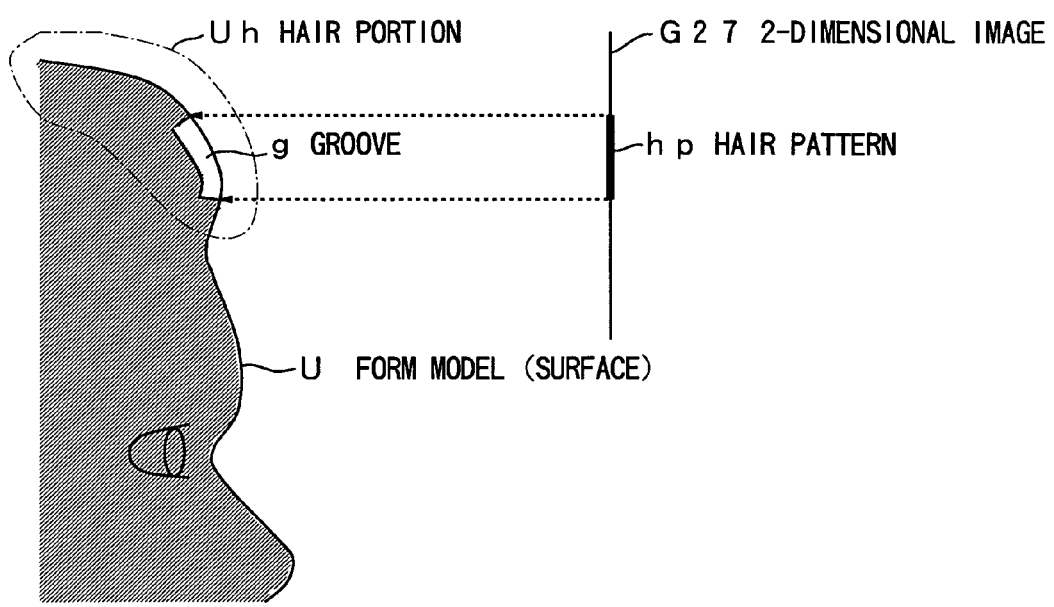
FIG. 15 is a schematic view of partial modification on a form model.

FIG. 15 is a schematic view of partial modification on a form model.

As shown in FIG. 15, the image G27 filled with the hair pattern is projected to a form model U and then the form model U is partially modified so as to provide with a groove g having a predetermined depth corresponding to the hair pattern hp. As a result, a striped undulation looking like the hair is attached to the hair portion Uh of the form model U so as to express hair texture. Meanwhile, the section of the groove g may be any shape such as U-shape, V-shape and rectangular. Further, the section thereof may be parabolic arch, just like shaved with an engraving knife having a round head. Instead of providing with the groove g, it is permissible to make that portion swell like the stripe. The section of the swollen portion may be set in any shape like the groove.

Hereinafter, an operation of the solid model production apparatus 1 according to the second embodiment will be described with reference to a flow chart.

An entire operation of the second embodiment is like the main flow chart of FIG. 8. At step #230 of the flow chart of FIG. 9, partial modifying processing is performed. According to the second embodiment, in the partial modifying processing, data modification for attaching striped undulation to the hair portion is carried out to express hair texture.

Figure 16:
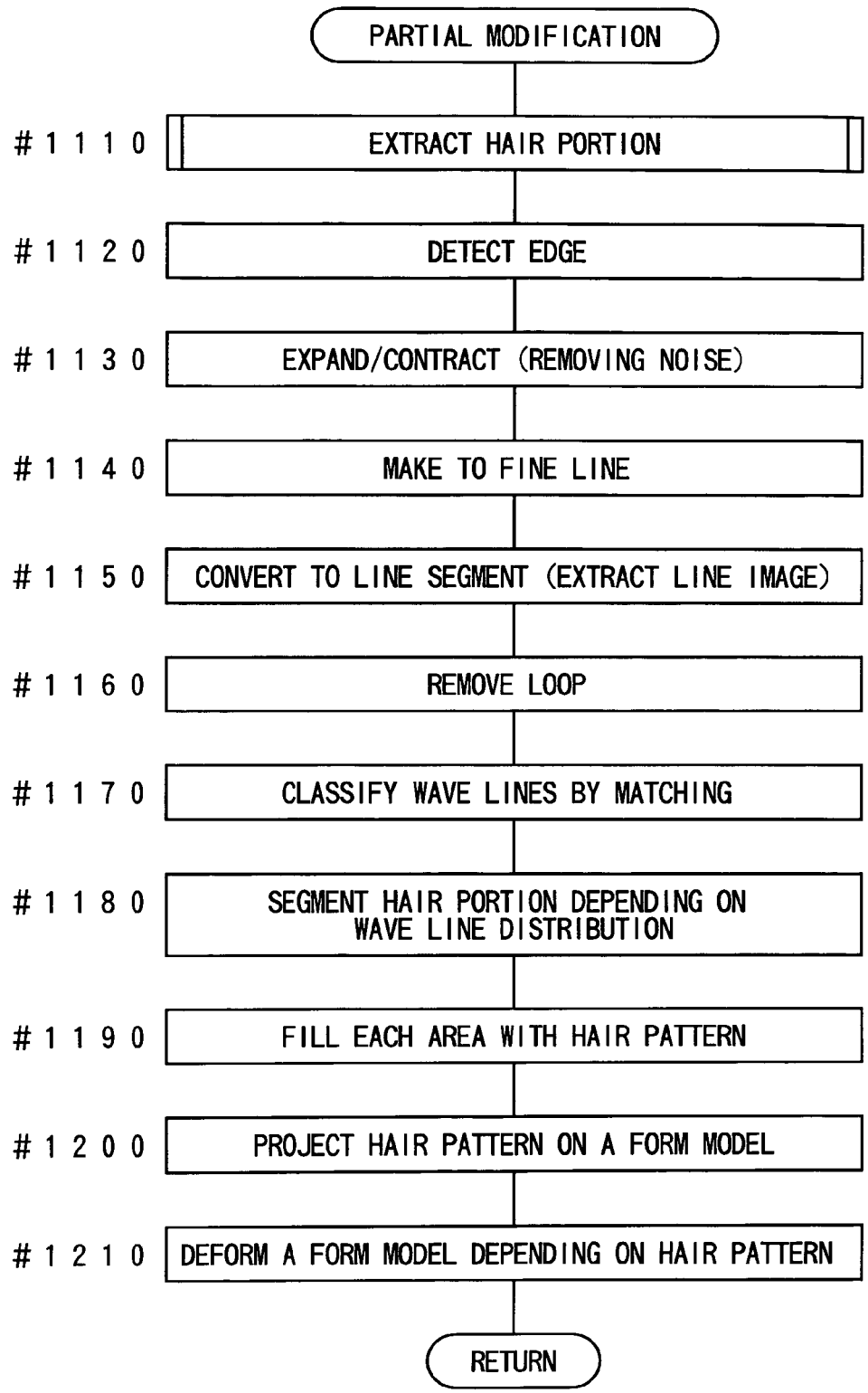
FIG. 16 is a flow chart showing a content of the second embodiment about the partial modifying processing at step #230 of FIG. 9.

FIG. 16 indicates a detailed content of the partial modifying processing.

In FIG. 16, first of all, a hair portion is extracted from the distance image G10 (#1110). A series of processings such as edge detection, noise removal, making into fine line, segmentation of line, and removal of loop are carried out so as to extract the hair wave line information (#1120–#1160).

The wave line is classified depending on matching with the mask pattern (#1170), the hair portion of the 2-dimensional image is segmented (#1180), and each segment is filled with an appropriate hair pattern (#1190). The hair pattern is projected to the form model (#1200) and the form model is partially modified so as to produce an undulating surface looking like the hair (#1210).

Figure 17:
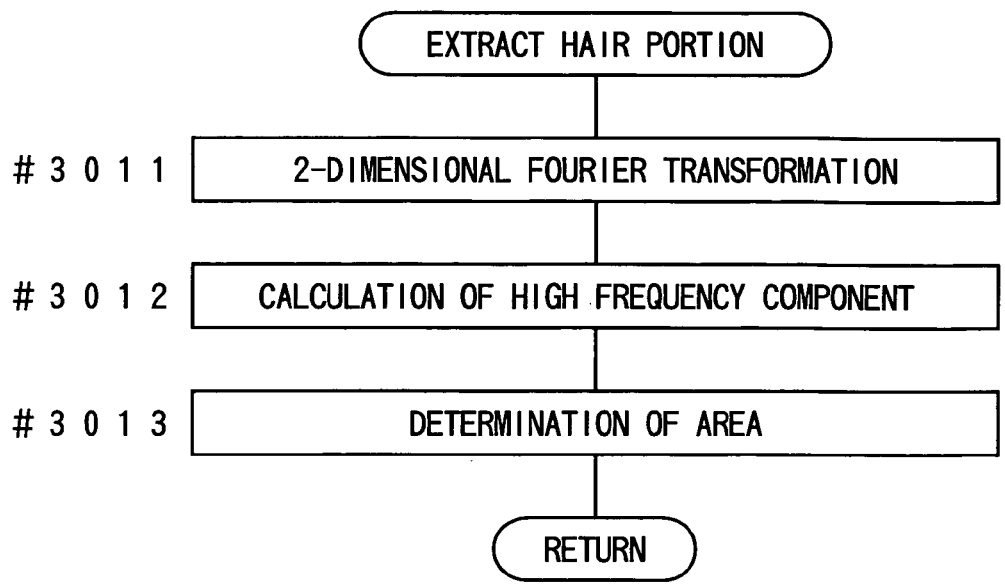
FIG. 17 is a flow chart showing extracting processing of the hair portion at step #1110 of FIG. 16.

FIG. 17 shows an extracting processing for extracting the hair portion. Each segment e produced by dividing the distance image G10 of the head of the customer 3 is subjected to 2-dimensional Fourier transformation (#3011). Integral operation is carried out to obtain an amount of component on higher frequency side relative to the set frequency f1 (#3012). Then, the segment e in which the integral value is more than the set value is determined to correspond to the hair portion (#3013).

Although according to the above described embodiment, an example of specifying the hair portion based on the spatial frequency distribution of the distance image G10 has been stated, it is possible to specify the hair portion based on the 2-dimensional image.

Figure 18:
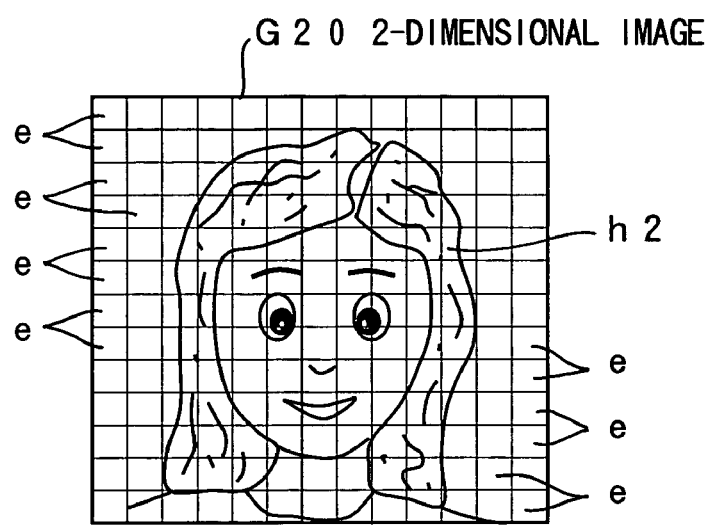
FIGS. 18(A) and 18(B) are diagrams showing other example of a method for specifying the hair portion.
Figure 18:
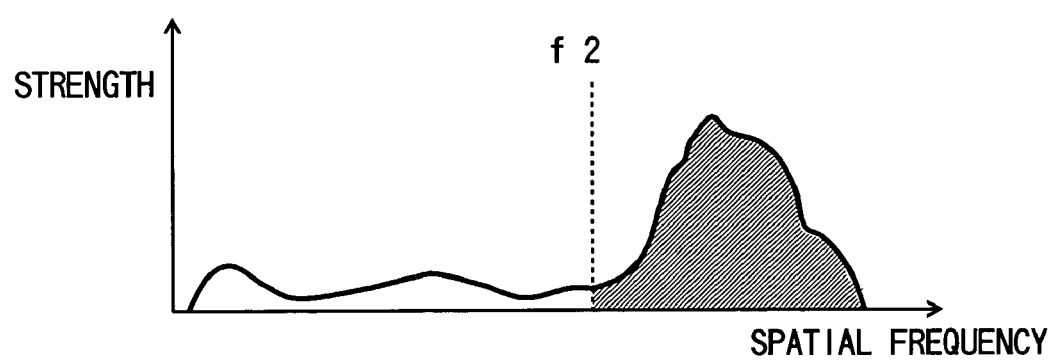

FIGS. 18(A) and 18(B) show other example for specifying the hair portion. As shown in FIG. 18(A), the 2-dimensional image G20 of the head obtained by color photographing on the customer 3 is divided to lattices. Each segment e produced by that division is subjected to 2-dimensional Fourier transformation so as to obtain the spatial frequency spectrum. As shown in FIG. 18(B), a range on the higher frequency side (shadow portion of the figure) relative to the set frequency f2 is subjected to integral operation about the spectrum intensity. Then, the segment e in which the integral value is more than the set value is determined to correspond to the hair portion. A set of the segments e determined like this is specified to be the hair portion.

Figure 19:
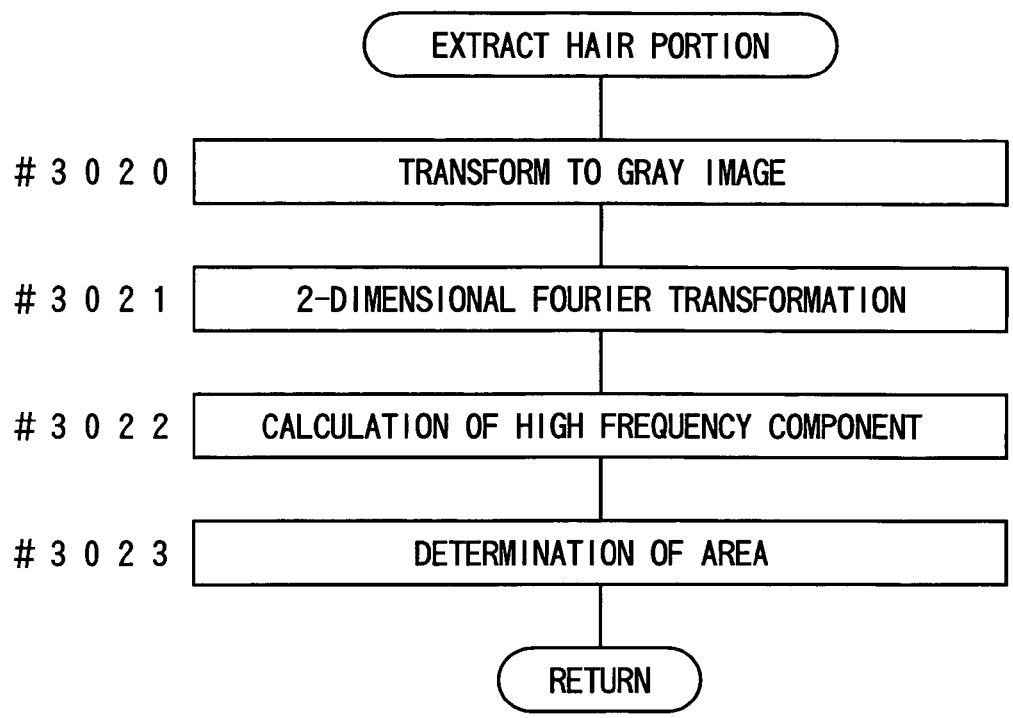
FIG. 19 is a flow chart showing extracting processing of the hair portion corresponding to FIG. 18.

FIG. 19 shows a processing for extracting the hair portion corresponding to FIGS. 18(A) and 18(B). The color 2-dimensional image G20 is transformed to gray image of 256 grades (#3020). The obtained gray image is divided to lattices and each segment e is subjected to Fourier transformation (#3021). Integral operation is carried out so as to obtain an amount of component on the higher frequency side relative to the set frequency f2 (#3022). Then, the segment e in which the integral value is above the set value is determined to correspond to the hair portion (#3023).

According to this embodiment, the hair portion is specified at a high precision thereby obtaining hair texture, so that a model of the human being head natural to see can be produced.

According to this embodiment, in data processing on the hair portion specified by analysis of the spatial frequency, it is permissible to replace with a different form data (such as stuffed doll's head and helmet form) instead of forming of the striped grooves and swelling.

According to this embodiment, it is permissible to determine the wave line directly from the 3-dimensional form instead of extracting the hair wave line information from the 2-dimensional image. That is, the normal vector is obtained at an appropriate sampling density on the model surface and a area in which the normal vector direction changes is regarded as a swollen portion indicating the direction of the wave line. Although the striped pattern is attached as the hair line pattern, a circular pattern may be attached instead depending on the hair style.

Third Embodiment

According to the third embodiment, by referring to the 2-dimensional photographing information of an object, a portion which may produce an extreme undulation in case non-contact 3-dimensional measuring is carried out is specified and that portion is smoothed.

Concretely, according to the third embodiment, in the hair data modification described in the second embodiment, a processing for smoothing the front hair portion is carried out. That is, according to this embodiment, to produce a model of the human being head having the hair natural to see, the data modification of automatically modifying the form model obtained by 3-dimensional measuring with reference to the color photographing information of the head portion (including the face) is carried out by the data processing unit 40. The modification is a processing for smoothing the front hair portion of the form model appropriately so as to eliminate a feeling of disharmony. The color photographing information is used for specifying the hair portion.

Figure 20:
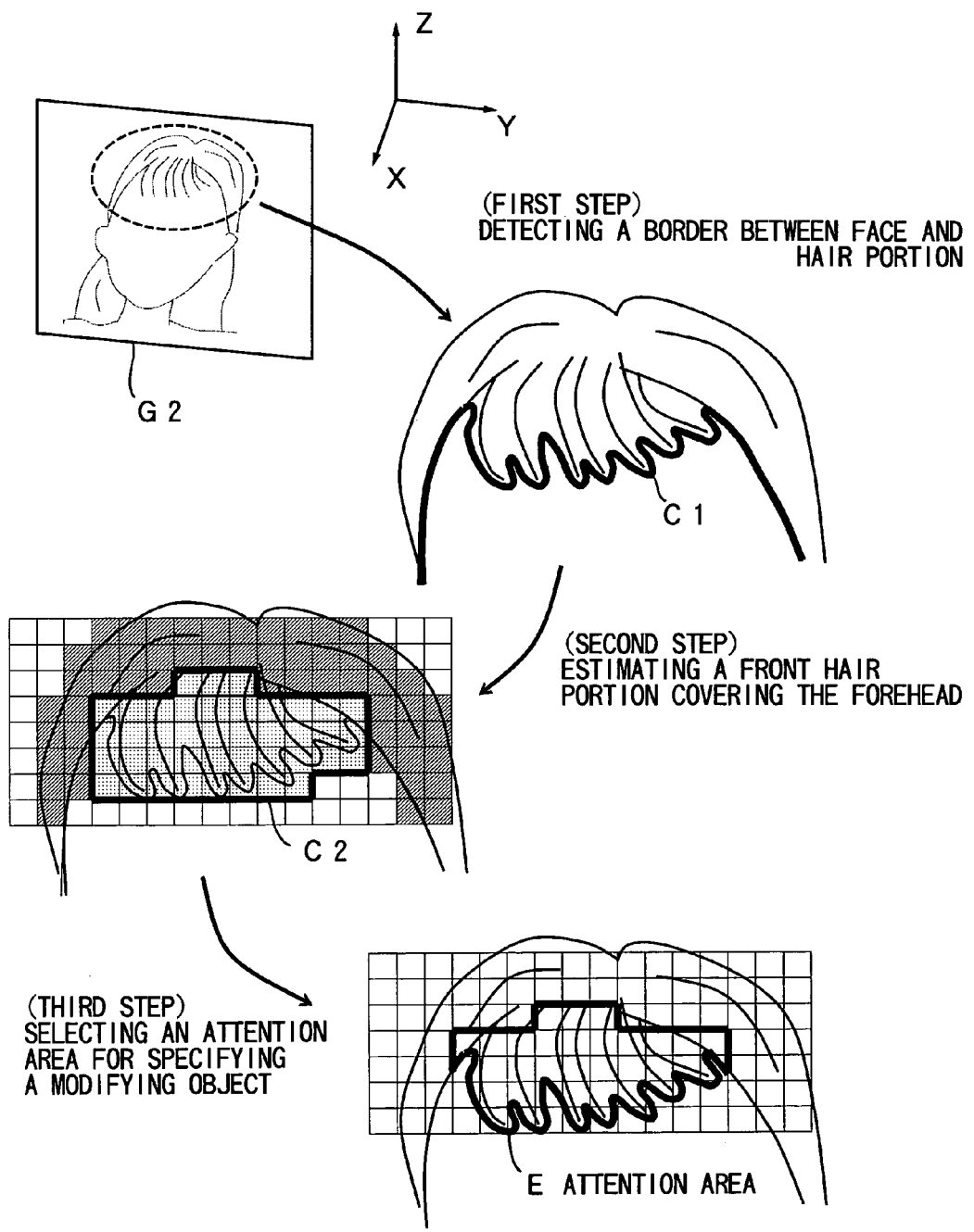
FIG. 20 is a diagram showing steps for selecting a modifying object portion according to a third embodiment.

FIG. 20 shows steps for selecting a modifying object portion.

(First Step)

First of all, the data processing unit 40 extracts a border C1 between the face and hair portion from the 2-dimensional image G2 expressed by the color image data DC.

The extracting procedure is as follows:

① By clustering in a particular color space (e.g., L* a* b* color space), a 2-dimensional image C2 is divided to fine areas of the same hue.

② Labeling on its result is performed so as to extract a continuous area of the same hue.

③ Using a template produced based on a statistics on the hair style and color, matching is carried out so as to determine which of the face portion, hair portion or other portion a certain portion is and a set of the fine areas corresponding to the border C1 between the face and hair portion is extracted.

(Second Step)

Then, an area of the front hair covering the forehead is estimated in such manner as follows:

① A 2-dimensional image G2 is divided to mosaic.

② An average of the hue of a portion corresponding to the hair is calculated.

③ An average of the hue of a portion corresponding to the face is calculated.

④ An area having a hue in the middle between the average of the hue of the hair portion and average of the hue of the face portion in the vicinity of the border C1 is regarded as the front hair portion.

⑤ The border C2 of the front hair portion is extracted.

(Third step)

An area surrounded by the border C1 and a portion of the border C2 above the border C1 is regarded as an attention area E. The reason for this procedure is that if an area inside the border C2 is regarded as the modifying range, the lower side becomes a straight line which is unnatural as a form of the hair portion.

Figure 21:
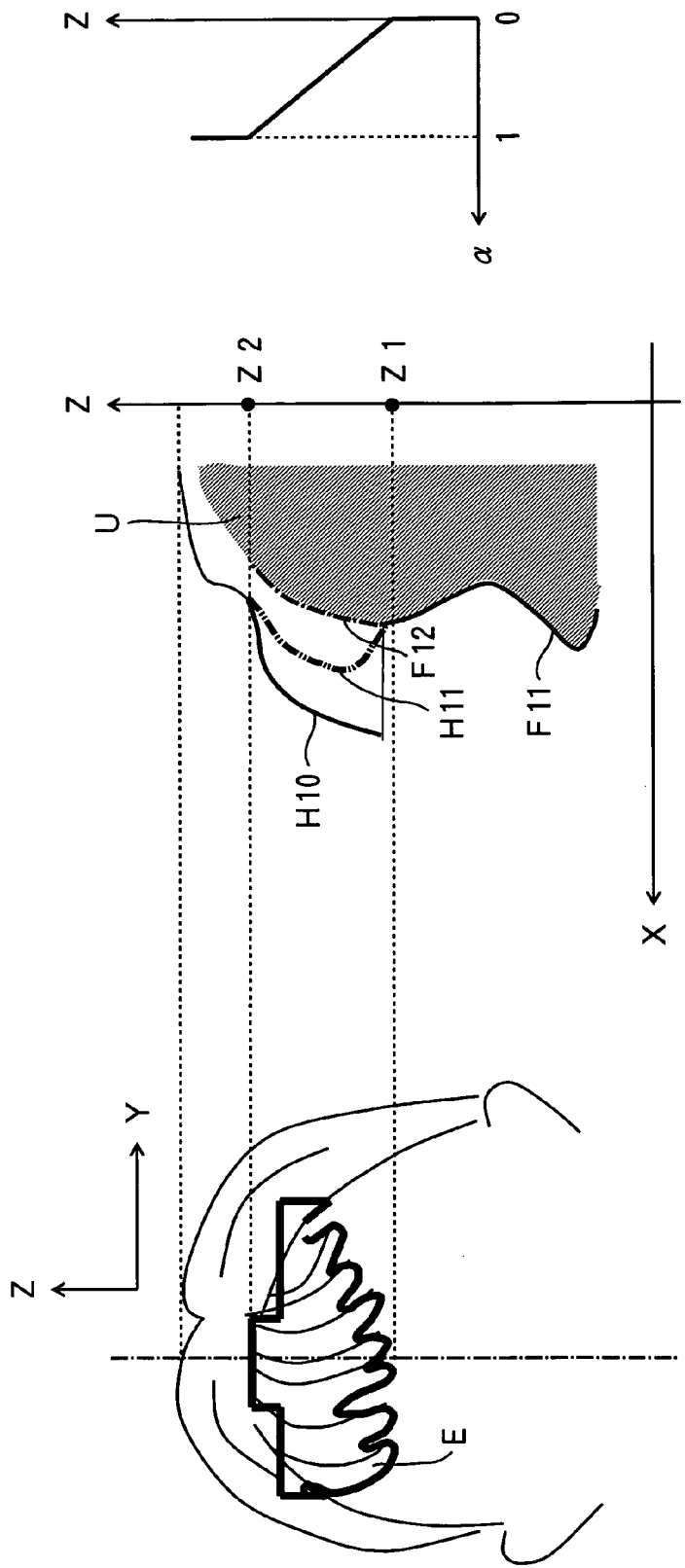
FIG. 21 is a diagram showing a procedure for partial modification of the form model.
Figure 22:
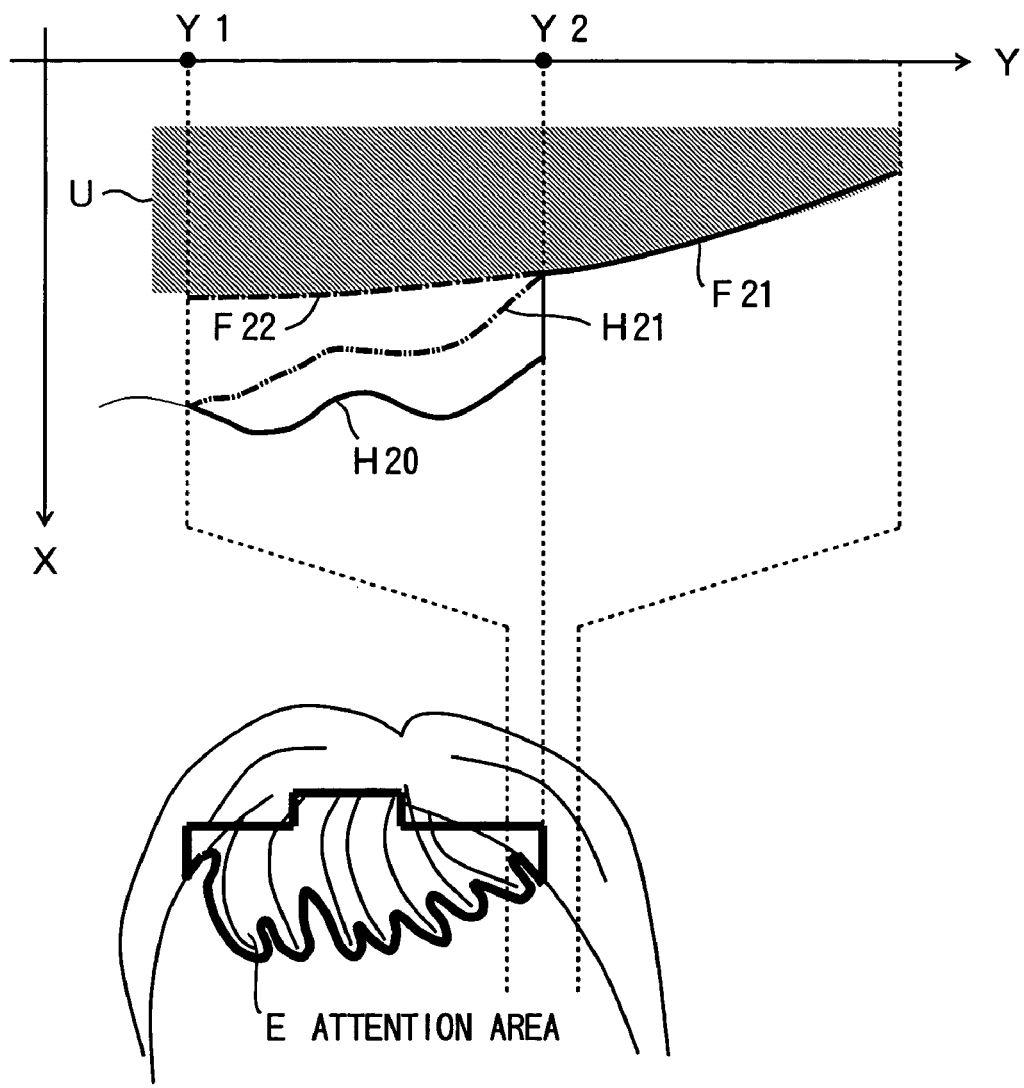
FIG. 22 is a diagram showing a procedure for partial modification of the form model.

FIGS. 21 and 22 show a procedure for partial modification of the form model. Here, XYZ Cartesian coordinates are applied to the form model specified by the form data DS. The back/forth direction of the face is regarded as X axis, the right/left direction thereof is regarded as Y axis and the vertical direction thereof is regarded as Z axis. As for the X axis, a direction from the form model U toward a line of vision upon the 3-dimensional measuring is regarded as positive direction. As for the Y axis, a direction from the left to the right is regarded as positive direction. As for the Z axis, a direction from down to up is regarded as positive direction.

In the XYZ Cartesian coordinates, the 2-dimensional image G2 and form model U are virtually disposed by taking a correspondence therebetween and the 2-dimensional image G2 is projected on the form model U. Then, as shown in FIG. 21, modification for securing a matching in the vertical direction (Z direction) between the forehead and hair portion is carried out in the procedure as follows:

① The form model U is cut along the ZX plane.

② On the cut surface, a point Z1 on which a bottom end (border C1) of the attention area E of the 2-dimensional image G2 is projected is regarded as a bottom end of the modification range and a point Z2 on which a upper end (contour C2) of the attention area E is projected is regarded as a upper end of the modification range.

③ Of the contour of the cut surface of the form model U, a curve between the point Z1 and point Z2 is regarded as original curve H10.

④ A curve F11 of a portion (face portion) below the point Z1 of the contour of the cut surface of the form model U is approximated by a 3-dimensional spline curve and a curve produced by extrapolating this spline curve F11 from the point Z1 up to the point Z2 is regarded as the cut line F12 for the head skin.

⑤ A curve H11 after the modification is produced from the cutting line F12 and original curve H10. The curve H11 is expressed by the formula (1).

⑥ The original curve H10 is replaced with the curve H11.

$$H11 = \alpha \times H10 + (1-\alpha) \times F12 \qquad (1)$$

| | |
|---|---|
| α(z) = 1 | [z ≥ Z2] |
| α(z) = (z − Z1)/(Z2 − Z1) | [Z1 < z < Z2] |
| α(z) = 0 | [z ≤ Z1] |
| z: Z coordinate | |

By this processing, the front hair portion of the form model U is modified so as to gradually extend from the forehead.

Figure 33:
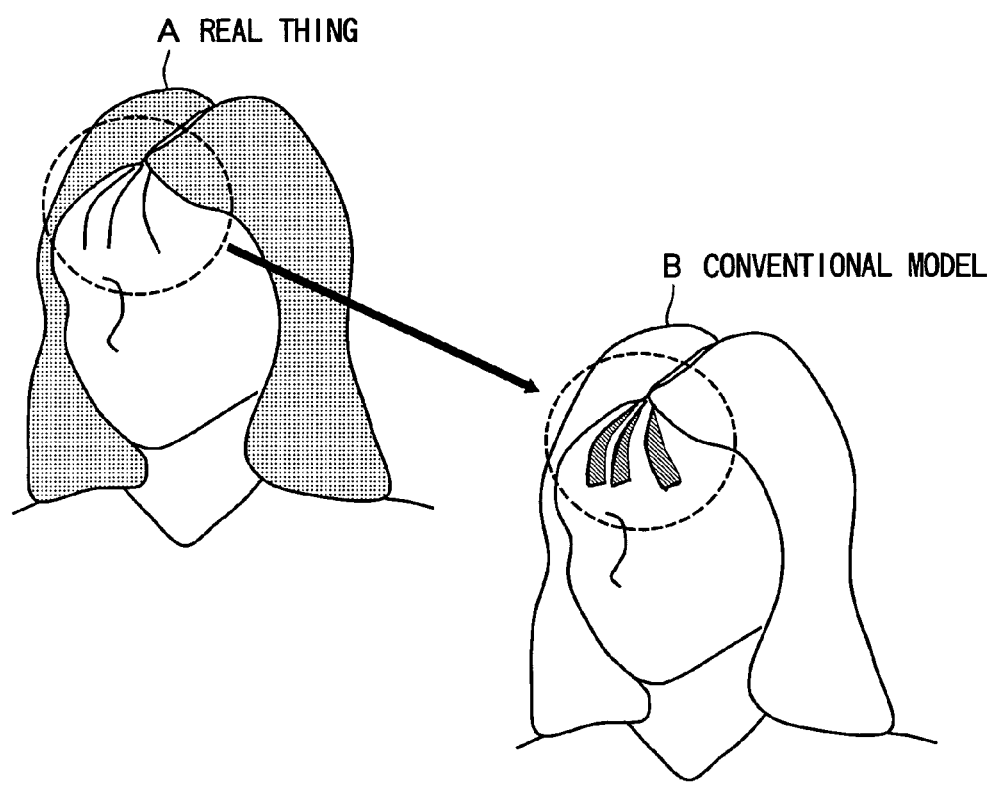
FIG. 33 is a diagram showing a conventional problem.

The same processing is repeated at every position with a specified interval including both ends in the Y direction of the attention area E so as to obtain a plurality of cut surfaces. By interpolating along these cut surfaces, a curve continuous in the Y direction is obtained. Through the above described processing, if an end of the front hair is apart from the forehead in a real object, a model provided with a natural feeling in which the front hair portion is not projected steely like a hood but is swollen mildly from the forehead is produced. Further, if the front hair droops sparsely, as shown in FIG. 33, the front hair is expressed by an undulated surface in which the back/forth (X direction) position changes continuously and smoothly instead of it that sheet-like protrusions are arranged in order. That is, about the front hair portion, the undulation of the form model U is smoothed.

Then, as shown in FIG. 22, modification is carried out to ensure matching in the right/left direction (Y direction) between the forehead and hair portion in the procedure as follows:

① The form model U subjected to the above described modification is cut along the XY plane.

② On that cut surface, a point Y2 on which a left/right end (right end in this example) of the attention area E of the 2-dimensional image G2 is regarded as an end of the modification range.

③ A point Y1 apart from the point Y2 inside of the attention area E with a predetermined distance is regarded as the other end of the modification range. At this time, the distance from the point Y2 to the point Y1 is selected so that the undulation of the model surface is natural. For example, the distance is about 1/10 relative to the face width.

④ Of the contour of the cut surface of the form model U, a curve between the point Y1 and point Y2 is regarded as the original curve H20.

⑤ Of the contour of the cut surface of the form model U, a curve F21 outside of the point Y2 is approximated by a 3-dimensional spline curve and a curve produced by extrapolating this spline curve F21 from the point Y2 up to he point 12 is used for the cutting line F22 of the head skin.

⑥ A curve H21 after the modification is produced from the cutting line F22 and original curve H20. The curve H21 is expressed by the formula (2).

⑦ The original curve H20 is replaced with the curve H21.

$$H21 = \beta \times H20 + (1-\beta) \times F22 \qquad (2)$$

| | |
|---|---|
| [Case of modification of the right side of the face] | |
| β(y) = 0 | [y ≥ Y2] |
| β(y) = \|y − Y1\|/\|Y2 − Y1\| | [Y1 < z < Y2] |
| β(y) = 1 | [y ≤ Y1] |
| y: Y coordinate | |
| [Case of modification of the left side of the face] | |
| β(y) = 1 | [y ≤ Y2] |
| β(y) = \|y − Y1\|/\|Y2 − Y1\| | [Y1 < z < Y2] |
| β(y) = 0 | [y ≥ Y1] |

By the above processing, the step between the right/left ends of the front hair portion and forehead is smoothed so that a form model in which the forehead is mildly continuous with the front hair portion is obtained.

The same processing is repeated at every position with a predetermined interval including both ends in the Z direction of the attention area E and as a result, a plurality of cut surfaces in which portions near the right and left ends of the front hair portion are modified are obtained. Then, by interpolating along these cut surfaces, a curve continuous in the Z direction is obtained.

An operation of the solid model production apparatus 1 according to the third embodiment will be described with reference to a flow chart.

An entire operation of the third embodiment is as shown by a main flow chart of FIG. 8. At step #230 of the flow chart of FIG. 9, partial modifying processing is performed.

Figure 23:
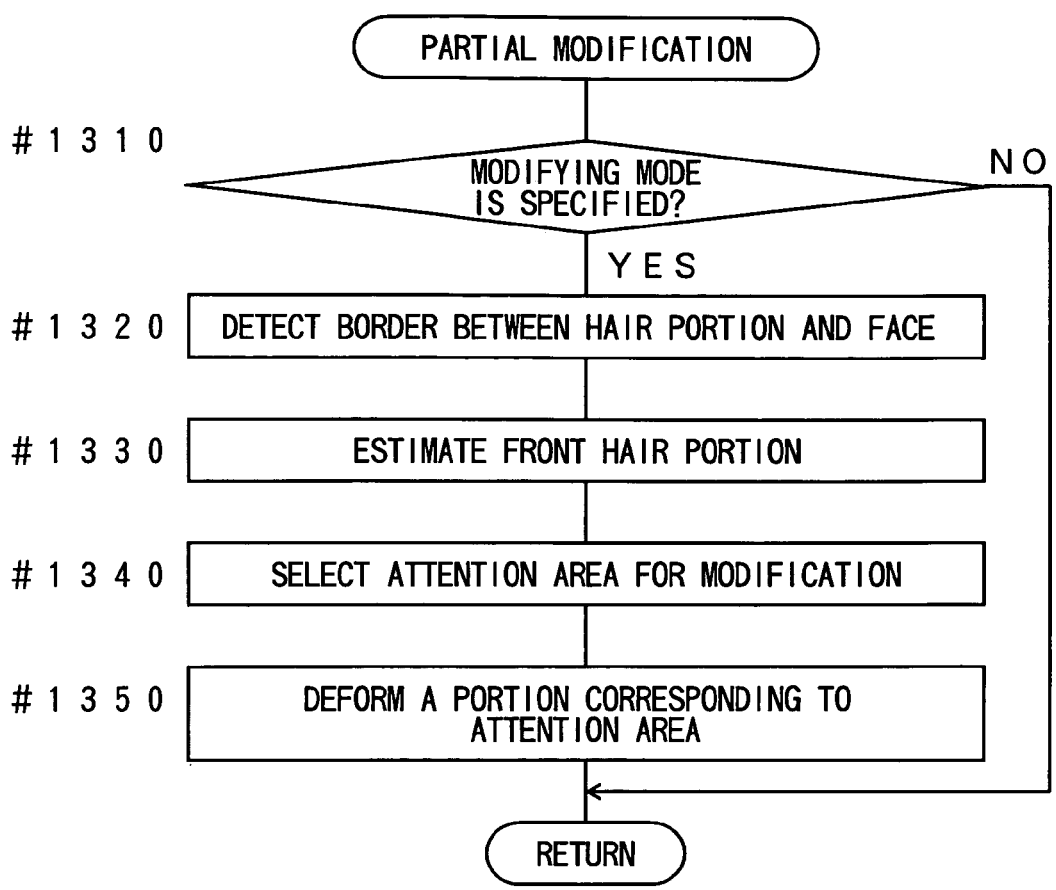
FIG. 23 is a flow chart showing a content of the third embodiment about the partial modifying processing at step #230 of FIG. 9.

According to the third embodiment, in the partial modifying processing, a processing for smoothing the front hair portion is carried out. FIG. 23 shows a detailed content of the partial modifying processing.

FIG. 23 is a flow chart showing a content of the third embodiment about the partial modifying processing at step #230 of FIG. 9.

Referring to FIG. 23, whether or not modification is needed is confirmed (#1310). If a mode for modification is used, as described in FIG. 20, the border C1 between the hair portion and face is extracted from the 2-dimensional image (#1320). An area of the front hair portion covering the forehead is estimated (#1330) and an attention area E relating to modification (partial smoothing) is selected (#1340). Then, of the form model U, a portion corresponding to the attention area E of the 2-dimensional image G2 is modified so as to obtain matching between the front hair portion and forehead (#1350).

According to this embodiment, in case of producing a model like a person having twisted hair or an animal having long hairs, it is possible to produce the model natural to see by preventing a formation of extreme undulations not seen in a real thing.

According to this embodiment, it is possible to divide the 2-dimensional image G2 to fine portions, detect the edge of each segment and extract the front hair portion by determining a magnitude of edge density. A segment corresponding to the front hair portion has a larger edge density than the other portions. This embodiment is applicable to all objects having a linear portion floating from a base portion as well as the hair of a living thing. The detection of the hair area may be carried out base on the 3-dimensional form data as well as based on the 2-dimensional image. For example, by analyzing the spatial frequency of the form data, the high frequency component is detected as the hair portion. Then, it is permissible to carry out the above smoothing on a portion of a predetermined width in the vicinity of a border with the face or a portion having a large undulation.

Fourth Embodiment

According to the fourth embodiment, a portion having a particular color of an object is modeled as a simple way by using plural different 2-dimensional photographing informations obtained from different photographing angles relative to the object. For example, an area in which the setting condition of color information is satisfied is extracted from each of plural 2-dimensional images obtained by photographing an object from different positions and coordinates of positions on the object corresponding to each contour of extracted plural areas in virtual space are calculated so as to produce a form model of a portion satisfying the setting condition of that object. Speaking further in detail, plural 2-dimensional images obtained by photographing an object from different positions so that the lines of vision intersect with each other at a single point are disposed in virtual space under an adjusted image size in which the reduction ratio of the object coincides with each other, in such a manner that the centers thereof coincide and the angle of each disposition meets the line of vision and direction of angle of view. Then, a relative position of the contour of an area satisfying the setting condition of the color information extracted from each 2-dimensional image is calculated. The center of an image refers to a position of a picture element corresponding to the line of vision upon photographing.

By using the modeling based on the 2-dimensional photographing information and the modeling based on the 3-dimensional measuring information allowing a higher precision modeling, a form model having a higher faithfulness is obtained.

Figure 24:
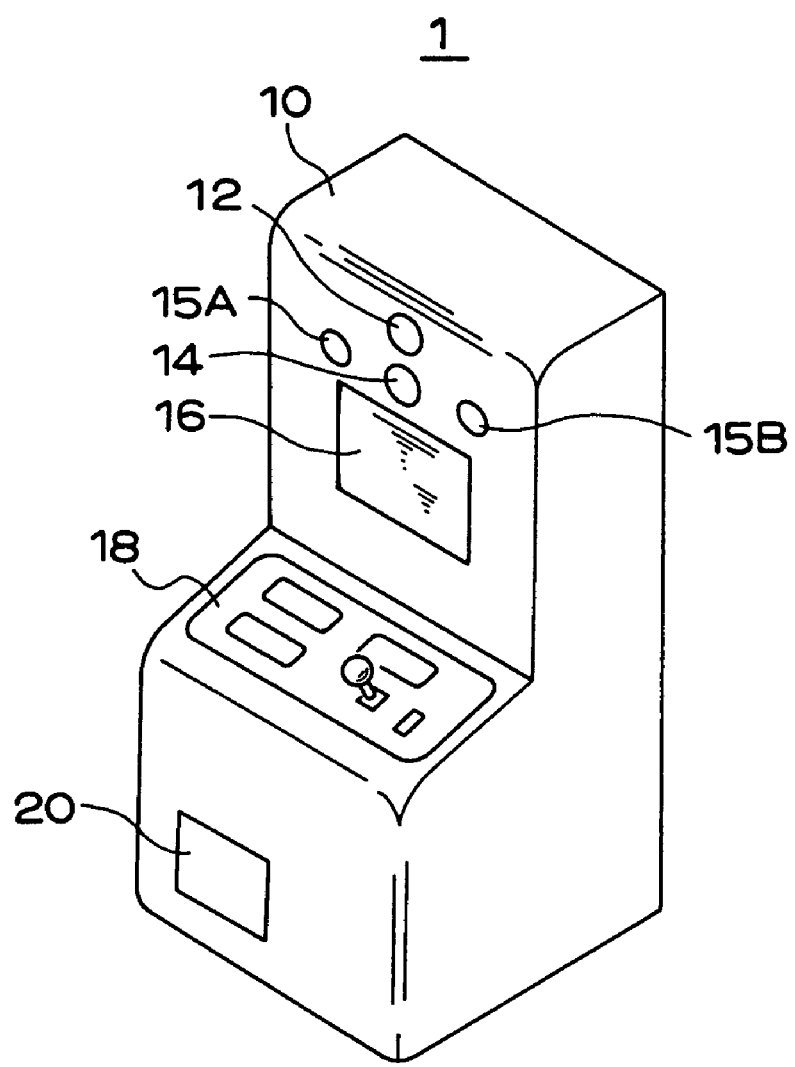
FIG. 24 is an appearance of the solid model production apparatus according to a fourth embodiment.

FIG. 24 is an appearance of the solid model production apparatus according to a fourth embodiment.

As shown in FIG. 24, in the solid model production apparatus 1*d* of the fourth embodiment, a front face of a upper half portion of the case 10 has three light receiving windows 14, 15A, and 15B. Optical 3-dimensional measuring is carried out using the light projection window 12 and light receiving window 14. Two light receiving windows 15A and 15B are used for 2-dimensional color photographing in an oblique direction particular to this embodiment. The other structure of the solid model production apparatus 1*d* is the same as the solid model production apparatus 1 of the first embodiment. Therefore, in a following description, the same reference numerals are attached to components having the same function as the solid model production apparatus 1 and a description thereof is omitted or simplified.

Figure 25:
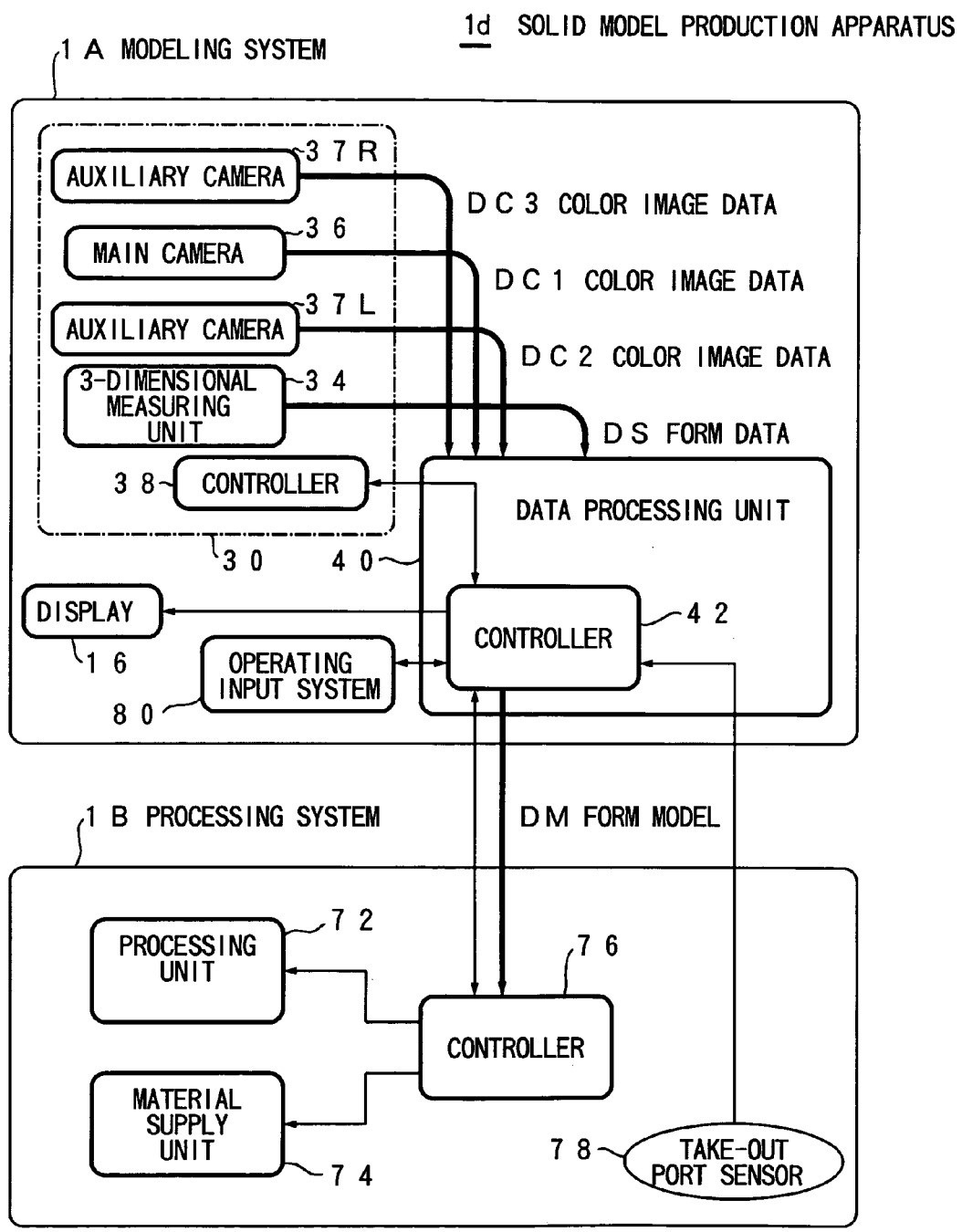
FIG. 25 is a block diagram showing the solid model production apparatus of the fourth embodiment in viewpoints of the function.

FIG. 25 is a block diagram showing the solid model production apparatus of the fourth embodiment in viewpoints of the function.

As shown in FIG. 25, the solid model production apparatus 1*d* comprises a modeling system 1A for generating a 3-dimensional form model of a model size and a processing system 1B for embodying the 3-dimensional form model.

The modeling system 1A comprises a photographing system 30 for converting appearance information of the customer 3 of an original object to digital data. The photographing system 30 comprises a 3-dimensional measuring unit 34 for converting form information to digital data by slit light projecting method, three 2-dimensional photographing units (main camera 36, auxiliary cameras 37L and 37R) for converting color information to digital data and a controller 38. Other optical method may be used for the 3-dimensional measuring instead of the slit light projecting method. Form data DS which is measuring information by the 3-dimensional measuring unit 34, color image data DC1 which is photographing information by the main camera 36 and color image data DC2 and DC3 which are photographing information by the respective auxiliary cameras 37L and 37R are input to the data processing unit 40. Because a relation of camera coordinates between the 3-dimensional measuring and 2-dimensional photographing has been known, position matching between the 3-dimensional form model based on the form data and 2-dimensional photographing image is easy. The data processing unit 40 contains an image processing circuit (not shown), which carries out various data processings including data modification particular to this embodiment. That is, the data processing unit 40 is a means for generating the second form data of this invention and also a means for synthesizing the first and second form data. The controller 42 of the data processing unit 40 performs the entire control on the solid model production apparatus 1*d* so as to supply the controller 38 of the photographing system 30 and controller 76 of the processing system 1B with an appropriate instruction. This controller 42 is connected to the display 16 and operating input system 80. The operating input system 80 includes the aforementioned operation panel 18 and fee receiving mechanism.

On the other hand, the processing system 1B comprises processing unit 72 for cutting material such as resin block, material supply unit 74 for supplying material to a processing position and carrying a processed product to the product take-out port 20, controller 76 and take-out port sensor 78. A detection signal of the take-out port sensor 78 is input to the controller 42. Meanwhile, it is permissible to apply a structure in which the controller 42 is entrusted with the control on the photographing system 30 and processing system 1B while the controllers 38 and 76 are omitted.

In the solid model production apparatus 1d of this embodiment, data modification for automatically modifying the 3-dimensional form model obtained by 3-dimensional measuring to produce a face model natural to see in which the contour of the hair portion is reproduced properly is carried out by the data processing unit 40. That is, the form of a data missing portion in which no effective measured value can be obtained of the hair portion is reproduced based on the 2-dimensional image.

Figure 26:
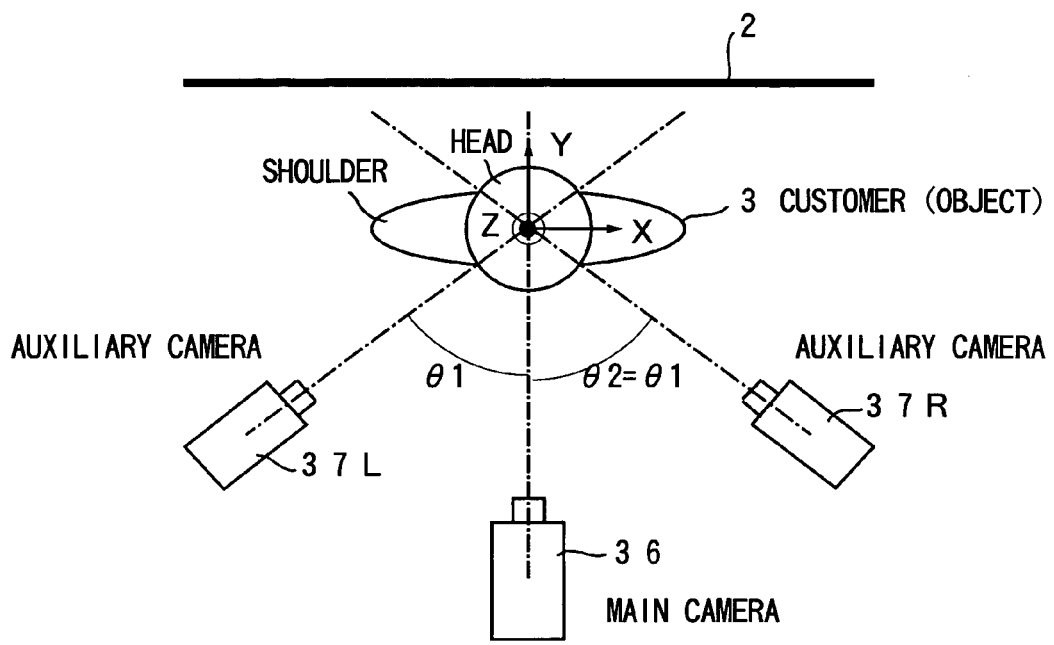
FIG. 26 is a diagram showing schematically a camera allocation for 2-dimensional photographing.

FIG. 26 shows schematically an allocation of cameras for 2-dimensional photographing. As shown in FIG. 26, XYZ coordinates are set in a space in which the customer 3 stands.

The X axis is set in the left/right direction, Y axis is set in the back/forth direction and Z axis is set in the vertical direction. A photographing position is determined correspondingly to a standard operating posture and in FIG. 26, the Z axis coincides with the center line of the head of the customer 3.

The main camera 36 and auxiliary cameras 37A and 37B are disposed radially around the Z axis so that respective lines of vision (light receiving axes) intersect with each other at a point (for example, home position of the coordinates) on the Z axis. The line of vision of the main camera 36 coincides with the Y axis. An inclination angle $\theta 1$ of the line of vision of the auxiliary camera 37L with respect to the main camera 36 is the same as the inclination angle $\theta 2$ of the line of vision of the auxiliary camera 37R. However, these inclination angles do not always have to be the same.

In such an allocation of the cameras, the main camera 36 takes a picture of the customer 3 from just front, the auxiliary camera 37L takes a picture of the customer 3 from a front oblique to the left and the auxiliary camera 37R takes a picture of the customer 3 from a front oblique to the right.

Meanwhile, the respective line of vision may be inclined with respect to the horizontal line and the inclination angles may be different depending on each camera.

Figure 27:
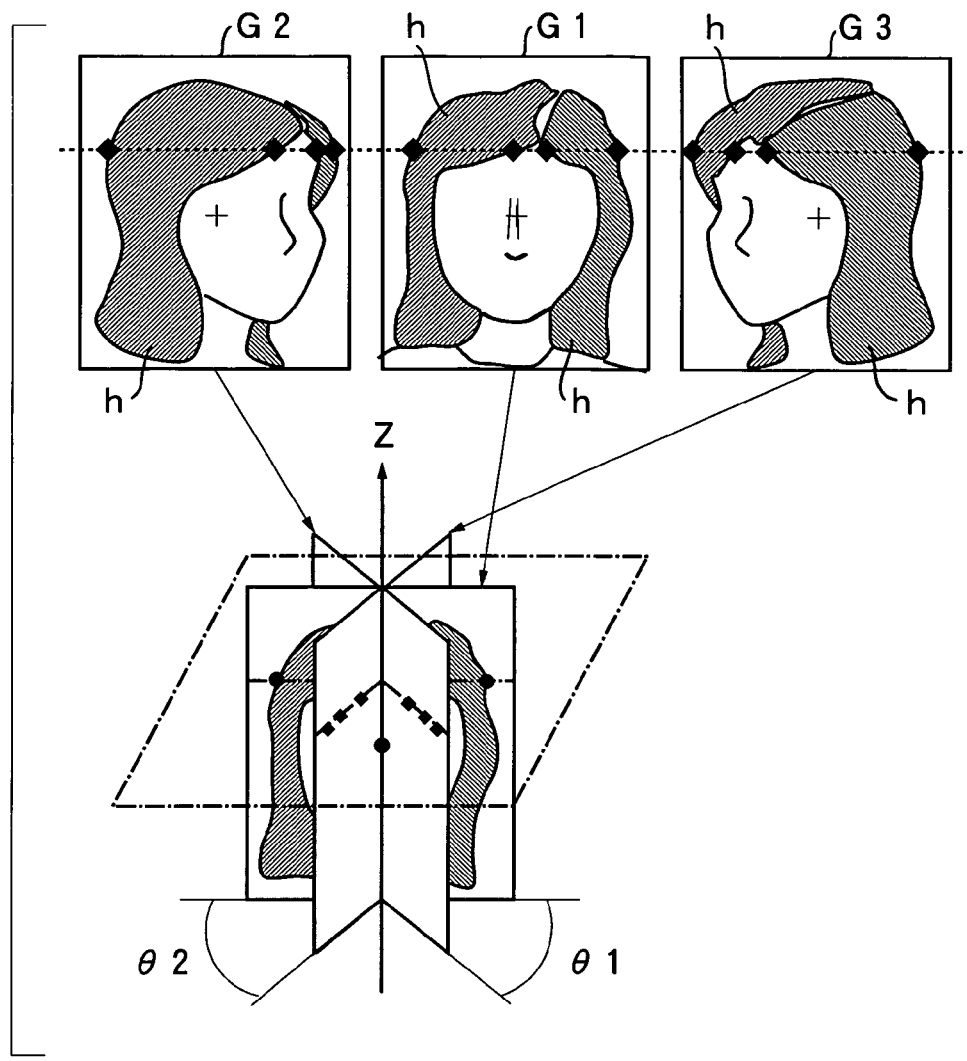
FIGS. 27(A) and 27(B) are diagrams for explaining a procedure for modeling according to the 2-dimensional image.
Figure 27:
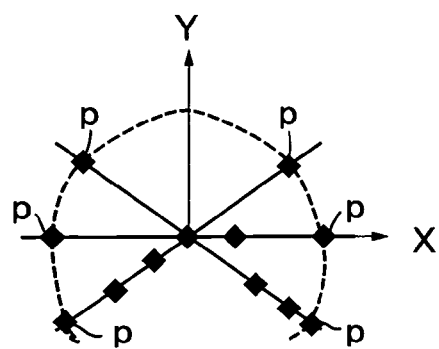
Figure 28:
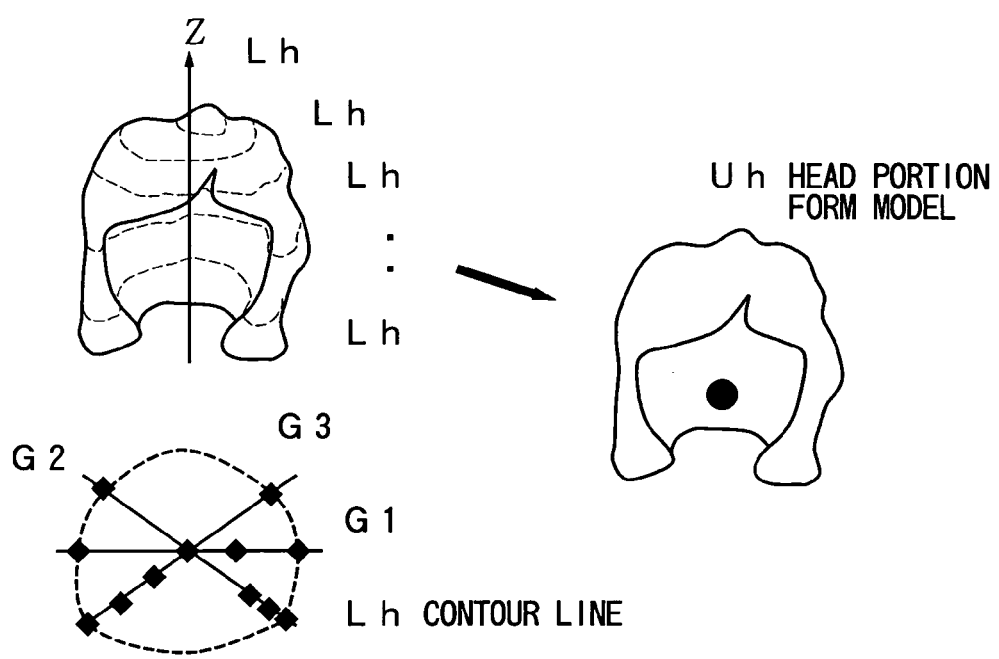
FIG. 28 is a diagram for explaining a procedure for modeling according to the 2-dimensional image.

FIGS. 27(A), 27(B), and 28 show a modeling procedure based on the 2-dimensional image. The data processing unit 40 extracts the head portion (hair figure) h shaded in FIG. 27A from the 2-dimensional images G1, G2, G3 expressed by the color image data DC1, DC2, DC3 and further extracts the contour of the hair figure h. The extraction of the hair figure h is carried out as follows:

① By clustering in a particular color space (for example, L* a* b* color space), the 2-dimensional image is divided to areas of the same hue.

② Labeling is carried out on its result so as to extract a continuous area of the same hue.

③ An area having a setting hue (for example, black and its near color) adjacent to the color (blue) area of the background sheet 2 is regarded as the hair figure h.

A 3-dimensional relation among positions on the object (customer 3) corresponding to the contour of each hair figure h extracted from the respective 2-dimensional images G1, G2, and G3 is specified. That is, coordinates of the contour of the hair figure h when the 2-dimensional images G1, G2, and G3 and the hair figure h extracted therefrom are disposed virtually in the 3-dimensional space corresponding to a photographing condition are calculated. When disposing in the 3-dimensional space, the centers of the images indicated by a symbol (+) in FIG. 27(A) are made to coincide with each other, the disposing angle relation among these images is made to correspond to relations of the line and angle of vision, and the images are expanded or reduced so that the reduction rates coincide with each other. The center of the image is a picture element position corresponding to the line of vision upon photographing. According to this embodiment, because the lines of vision upon photographing exist on the same plane, if the respective 2-dimensional images G1, G2, and G3 are disposed along the Z axis with the 2-dimensional images G2, and G3 inclined at the angles $\theta 1$ and $\theta 2$ with respect to the 2-dimensional image G1, the angles of vision thereof meet each other. If the magnification of photographing is set to the same one, expansion or reduction is not needed. Because only the relative position of the hair figure h has to be made clear, it is not necessary to enlarge the hair figure h so as to correspond to a real object at this stage.

FIG. 27(B) shows a relation of the contours of the hair figure on a plane perpendicular to the Z axis in the form of a plan view. Upon modeling an outer edge of the hair portion, of positions on the X axis of the contour at an attention position on the Z axis, two points on both ends thereof are particularly important.

Next, intersections between the contour of the three hair figures h disposed virtually and a plane (contour line) perpendicular to the Z axis are connected with a B spline curve and the contour line Lh of the hair portion is calculated. Then, a surface produced by connecting the contour lines Lh at plural positions along the Z axis by smoothing is regarded as a form model Uh.

Figure 29:
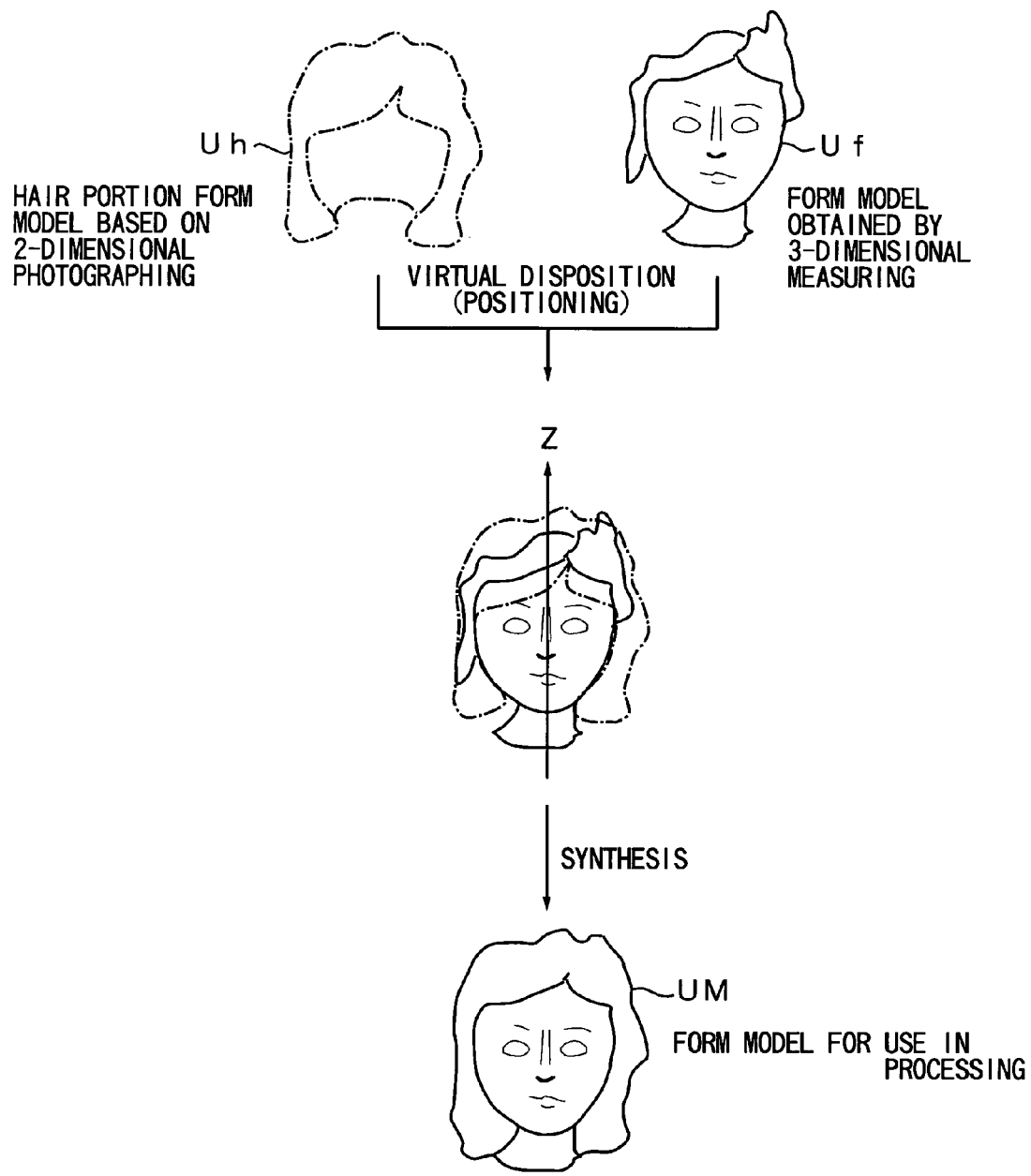
FIG. 29 is a diagram showing schematically synthesis of the form models.

FIG. 29 shows schematically a synthesis of the form model. By disposing a form model Uh of the hair portion produced in the above manner and a form model Uf of the customer 3 obtained by 3-dimensional measuring by positioning in a 3-dimensional space, set operation to obtain a sum of both is carried out to synthesize to a single form model UM.

At this time, the form model Uh of the hair portion is handled as an auxiliary model for restoring a measuring error and if an overlapping error occurs, as a rule, the data of the form model Uf is modified with preference.

By processing with the form model UM obtained in this manner, even if a part of data on the hair portion cannot be obtained in the 3-dimensional measuring, it is possible to produce a face model in which an outline of the hair portion is reproduced properly.

Hereinafter, an operation of the solid model production apparatus 1d of the fourth embodiment will be described with reference to a flow chart.

An entire operation of the fourth embodiment is as shown in the main flow chart of FIG. 8. At step #230 of the flow chart of FIG. 9, partial modifying processing is carried out.

In the partial modifying processing according to the fourth embodiment, the form model Uh of the hair portion is produced and synthesized with the form model Uf based on the 3-dimensional measuring data. That is, the form model Uf is subjected to partial modification by attaching the hair portion.

Figure 30:
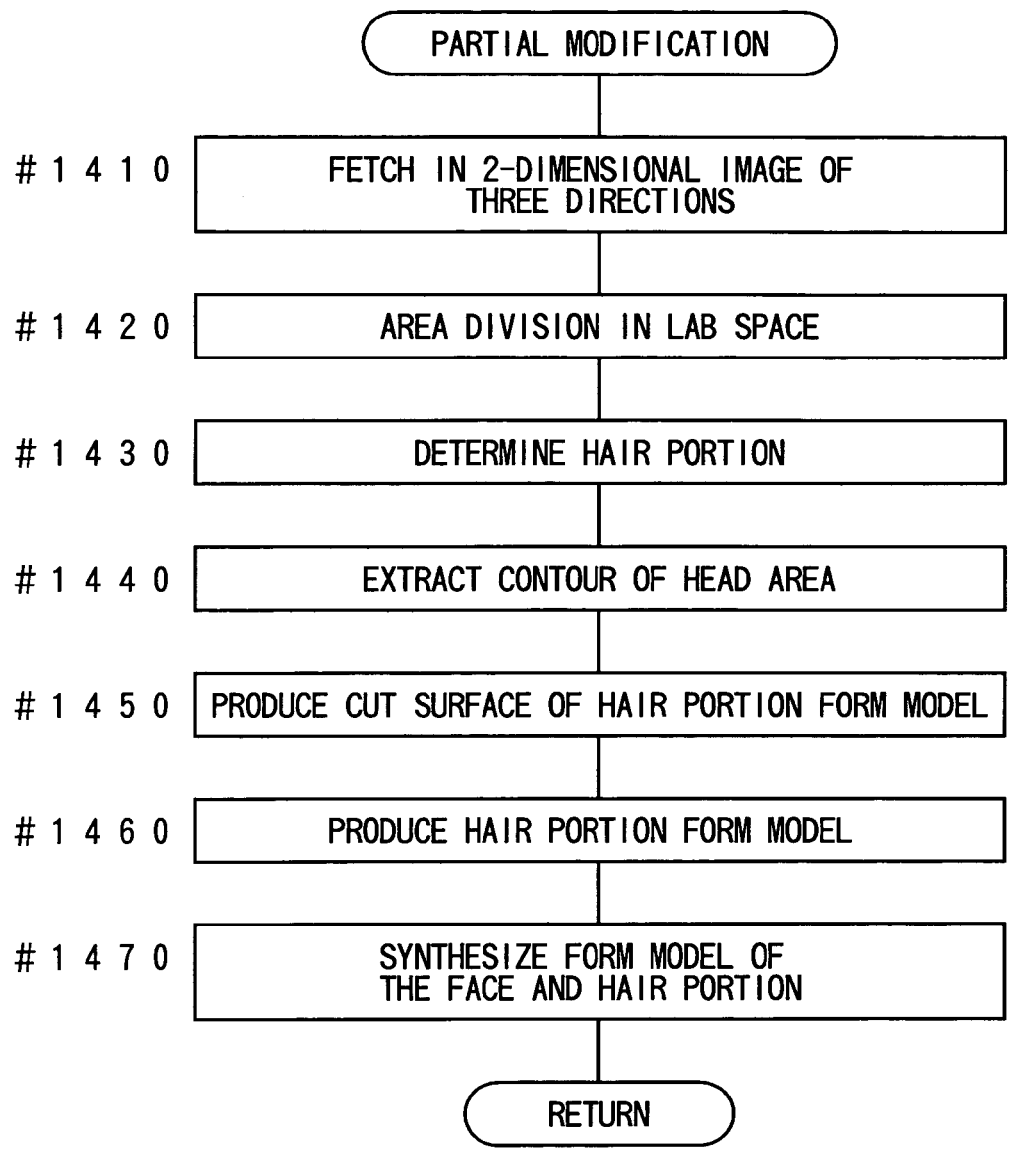
FIG. 30 is a flow chart showing a content of the fourth embodiment about the partial modifying processing at step #230 of FIG. 9.

FIG. 30 shows a detailed content of the partial modifying processing.

That is, in FIG. 30, the 2-dimensional images G1, G2, G3 which are three direction photographing information are fetched in (#1410) and area division in the L* a* b* color space is carried out (#1420). The setting hue area is discriminated from the hair figure h (#1430) and its contour is extracted (#1440). A contour line Lh corresponding to the contour of the hair figure h is obtained (#1450) and by connecting the contour lines Lh, the form model Uh is produced (#1460). Then, the form model Uh of the hair portion based on the 2-dimensional image and form model Uf based on the 3-dimensional measuring are synthesized (#1470).

According to this embodiment, the form of an object having a portion difficult to measure 3-dimensionally like the hair portion of the human being can be modeled.

According to this embodiment, a form produced from the 2-dimensional image by estimating a form of a head skin face from the 3-dimensional measuring data and referring thereto is desired not to be inside the head skin face estimated in the following procedure.

Figure 31:
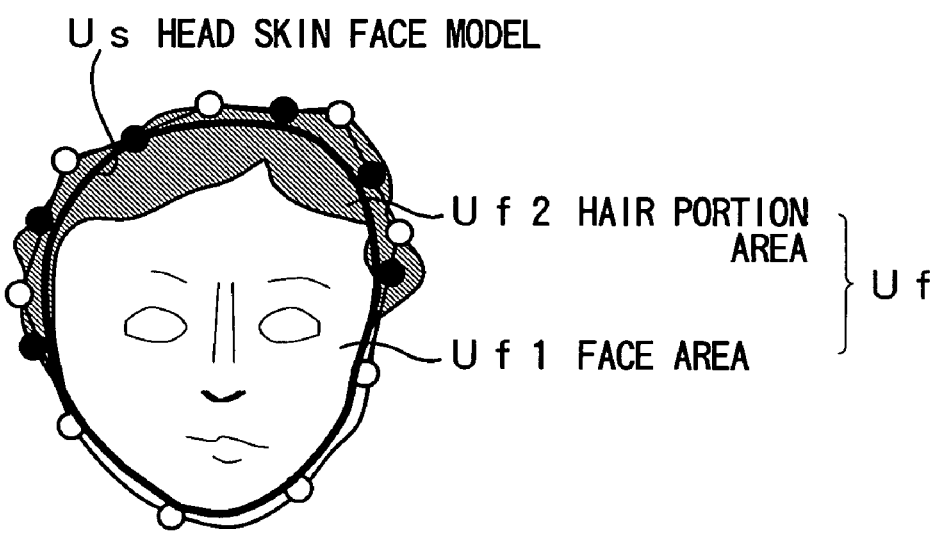
FIG. 31 is a diagram schematically showing an estimation of a head skin face.
Figure 32:
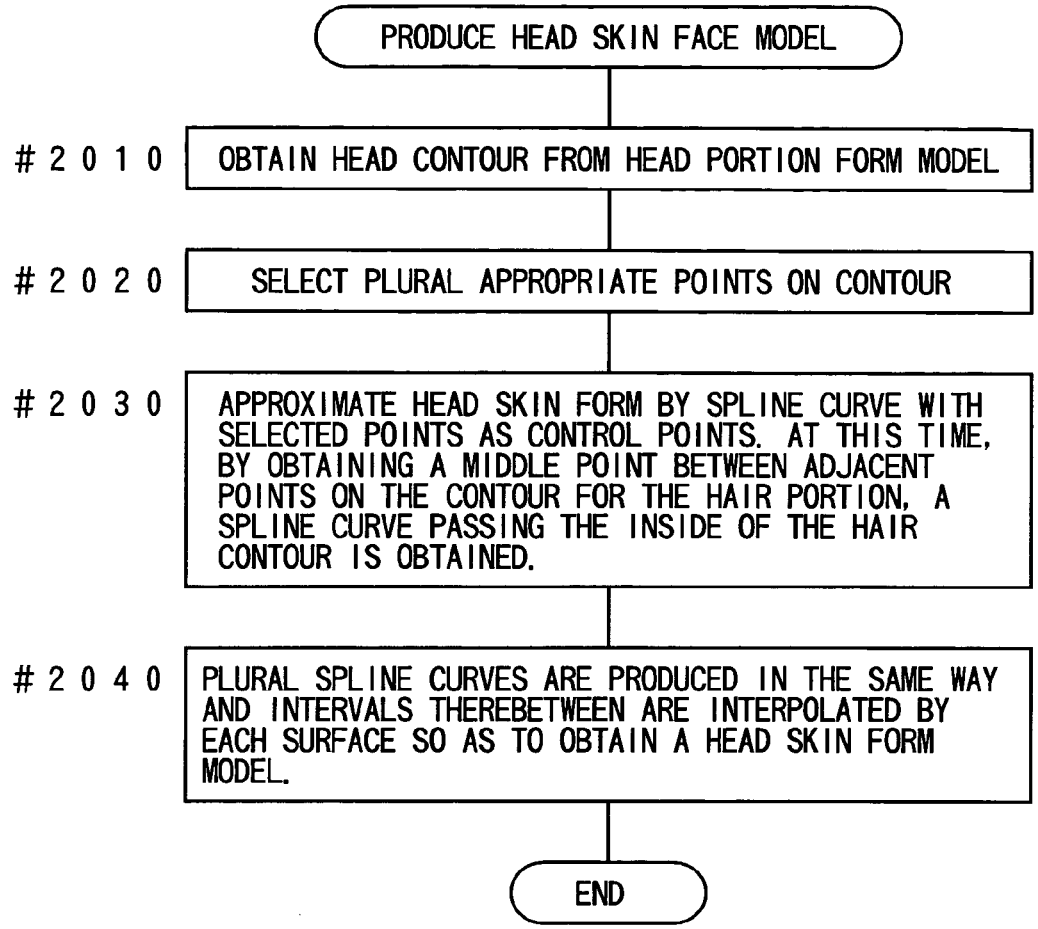
FIG. 32 is a flow chart showing an example of a production procedure on a head skin face form model.

FIG. 31 shows a schematic view for estimating a form of the head skin face. FIG. 32 shows an example of a production procedure for the head skin face model through a flow chart.

In FIG. 32, the contour of the head of the customer 3 is obtained from the form model Uf comprising the face area Uf1 and hair area Uf2 (#2010). A plurality of appropriate points (white circles of FIG. 31) on the contour are selected, and with selected points and middle points (black circle of FIG. 31) between adjacent points of them used as a control point, the form of a head skin face is approximated by a spline curve (#2020 and #2030). For the face area Uf1, points on the contour are used as a control point and for the hair area Uf2, the middle points are used as a control point, so as to obtain an approximate curve passing the inside of the contour of the hair portion. In the same procedure, a plurality of the approximate curves are obtained and an interval therebetween is interpolated by a surface so as to obtain the head skin face form model Us (#2040).

What is claimed is:

1. A data processing apparatus for processing inputted 3-dimensional form data of an object, said data processing apparatus comprising:
   a modifying unit which modifies a form of a part of the inputted 3-dimensional form data with maintaining a form of other parts thereof based on 2-dimensional image data of the object.

2. The data processing apparatus of claim 1, further comprising:
   a first generating unit which generates the 2-dimensional image data of the object;
   a second generating unit which generates the 3-dimensional form data of the object independent of the 2-dimensional image data generated by the first generating unit; and
   means for inputting the 2-dimensional image data and the 3-dimensional form data of the object to the data processing apparatus.

3. The data processing apparatus of claim 1, wherein said modifying unit extracts an area from the 2-dimensional image data based on a predetermined condition, and modifies the form of the part of the 3-dimensional form data corresponding to the area.

4. The data processing apparatus of claim 3, wherein the object is a head of a human.

5. The data processing apparatus of claim 4, wherein the area corresponds to at least one of hair, a forehead, eyebrows, eyes, irises of eyes, and lips of the human.

6. The data processing apparatus of claim 1 wherein
   said modifying unit extracts a first area from the 2-dimensional image data based on a first predetermined condition and a second area from the 3-dimensional form data based on a second predetermined condition, and
   said modifying unit modifies the form of the part of the 3-dimensional form data corresponding to the first area and the form of the part of the 3-dimensional form data corresponding to the second area.

7. The data processing apparatus of claim 6, wherein the object is a head of a human.

8. The data processing apparatus of claim 7, wherein the first area corresponds to at least one of eyebrows, eyes, irises of eyes, and lips of the human, and the second area corresponds to at least one of a nose and a neck of the human.

9. The data processing apparatus of claim 6, wherein for extracting the first area, area division is carried out for a shade portion of the object by referring to the 2-dimensional image data of a surrounding portion.

10. The data processing apparatus of claim 1, wherein the object is a head of a human, and the part corresponds to at least one of hair, a forehead, eyes, irises of eyes, a nose, cheeks, lips, and a neck of the human.

11. The data processing apparatus of claim 10, wherein said modifying unit modifies the form of the part of the 3-dimensional form data to emphasize a portion of the object corresponding to the part.

12. The data processing apparatus of claim 10, wherein said modifying unit modifies the form of the part of the 3-dimensional form data to smooth a portion of the object corresponding to the part.

13. The data processing apparatus of claim 1, wherein said modifying unit modifies the form of the part of the 3-dimensional form data in the case where the data processing apparatus is set in a specific mode.

14. A method for processing 3-dimensional form data of an object, said method comprising the steps of:
   (a) inputting 2-dimensional image data of the object and the 3-dimensional form data of the object, the 3-dimensional form data and the 2-dimensional image data being independent of each other; and
   (b) modifying a form of a part of the 3-dimensional form data with maintaining a form of other parts thereof based on 2-dimensional image data of the object.

15. The method of claim 14, the steps (b) comprising the steps of:
   (b-1) extracting an area from the 2-dimensional image data based on a predetermined condition; and
   (b-2) modifying the part of the 3-dimensional form data corresponding to the area.

16. The method of claim 15, wherein the area corresponds to at least one of hair, a forehead, eyebrows, eyes, irises of eyes, and lips of a human as the object.

17. The method of claim 14, wherein the step (b) comprising the steps of:
   (b-1) extracting a first area from the 2-dimensional image data based on a first predetermined condition;

(b-2) extracting a second area from the 3-dimensional form data based on a second predetermined condition; and (b-3) modifying parts of the 3-dimensional form data corresponding to the first and second areas.

18. The method of claim 17, wherein the first area corresponds to at least one of eyebrows, eyes, irises of eyes, and lips of a human as the object, and the second area corresponds to at least one of a nose and a neck of the human.

19. The method of claim 14, wherein a partial form of the object corresponding to the part is emphasized in the step (b).

20. The method of claim 14, wherein a partial form of the object corresponding to the part is smoothed in the step (b).

21. A 3-dimensional data processing apparatus for carrying out data processing with respect to a specified portion in a 3-dimensional form model of an object, said data processing apparatus comprising:

an obtaining portion for obtaining a distance image expressing distance information of the object by intensity; and a processing portion for dividing the obtained distance image into segments, determining if each of the segments corresponds to the specified portion in accordance with spatial frequency of the distance image within each of the divided segment and carrying out predetermined data processing with respect to each of the segments determined to correspond to the specified portion.

22. The 3-dimensional data processing apparatus of claim 21, further comprising:

a measuring portion for measuring a 3-dimensional form of the object to generate 3-dimensional form data of the object, wherein said obtaining portion obtains a distance image by generating the distance image based on the measured 3-dimensional form data.

23. The data processing apparatus of claim 21, wherein said controller further executes the step of:

(c) modifying a part of the 3-dimensional form data corresponding to the area.

24. A 3-dimensional form data processing apparatus for producing a model, said processing apparatus comprising:

a first extracting portion for extracting a first classified characteristic area satisfying a first predetermined condition from a 2-dimensional image obtained by photographing an object, a second extracting portion for extracting a second classified characteristic area satisfying a second predetermined condition from a distance image obtained by 3-dimensional measurement with respect to the object; and a processing portion for carrying out data modification for modifying a part corresponding to the extracted first classified characteristic area and a part corresponding to the extracted second classified characteristic area with respect to a form model of the object obtained by the 3-dimensional measurement.

* * * * *